US012793532B2

(12) United States Patent
Schultz et al.

(10) Patent No.: US 12,793,532 B2
(45) Date of Patent: Nov. 10, 2026

(54) PERSONAL TRACKING DEVICE

(71) Applicant: IOWISE TECHNOLOGIES, INC., Austin, TX (US)

(72) Inventors: Douglas Schultz, Beaumont, TX (US); Thomas Stith, II, Houston, TX (US)

(73) Assignee: IOWISE TECHNOLOGIES, INC., Austin, TX (US)

(*) Notice: Subject to any disclaimer, the term of this patent is extended or adjusted under 35 U.S.C. 154(b) by 43 days.

(21) Appl. No.: 19/084,541

(22) Filed: Mar. 19, 2025

(65) Prior Publication Data

US 2025/0299557 A1 Sep. 25, 2025

Related U.S. Application Data

(60) Provisional application No. 63/567,357, filed on Mar. 19, 2024.

(51) Int. Cl.

| | |
|---|---|
| ***G08B 1/08*** | (2006.01) |
| ***G06F 1/16*** | (2006.01) |
| ***G08B 7/06*** | (2006.01) |
| ***G08B 25/01*** | (2006.01) |

(52) U.S. Cl.

CPC ........... *G08B 25/016* (2013.01); *G06F 1/163* (2013.01); *G08B 7/06* (2013.01)

(58) Field of Classification Search

CPC .... G08B 25/016; G08B 7/06; G08B 21/0286; G08B 21/0288; G08B 21/22; G06F 1/163

USPC ........................................................ 340/539.1

See application file for complete search history.

(56) References Cited

U.S. PATENT DOCUMENTS

| | | | | |
|---|---|---|---|---|
| 2006/0103537 A1* | 5/2006 | Defant | ............... | G08B 21/0269 340/573.4 |
| 2024/0021061 A1* | 1/2024 | Watson | ............. | G08B 21/0269 |

* cited by examiner

*Primary Examiner* — Tai T Nguyen

(74) *Attorney, Agent, or Firm* — John Schell

(57) ABSTRACT

A personal tracking device includes a base unit including a housing defining a connector interface, the connector interface including a set of rails; and a bracelet including: a strap; a first connector attached at a first end of the strap, the first connector including a first guide on a side of the first connector connected to the strap and including an interjamb disposed on an opposite side of the first connected from the strap; a second end connector attached at a second end of the strap, the second connector including a second guide on a side of the second connector connected to the strap and including a blank on an opposite side of the second connector and configured to receive the interjamb.

20 Claims, 25 Drawing Sheets

*FIG. 10*
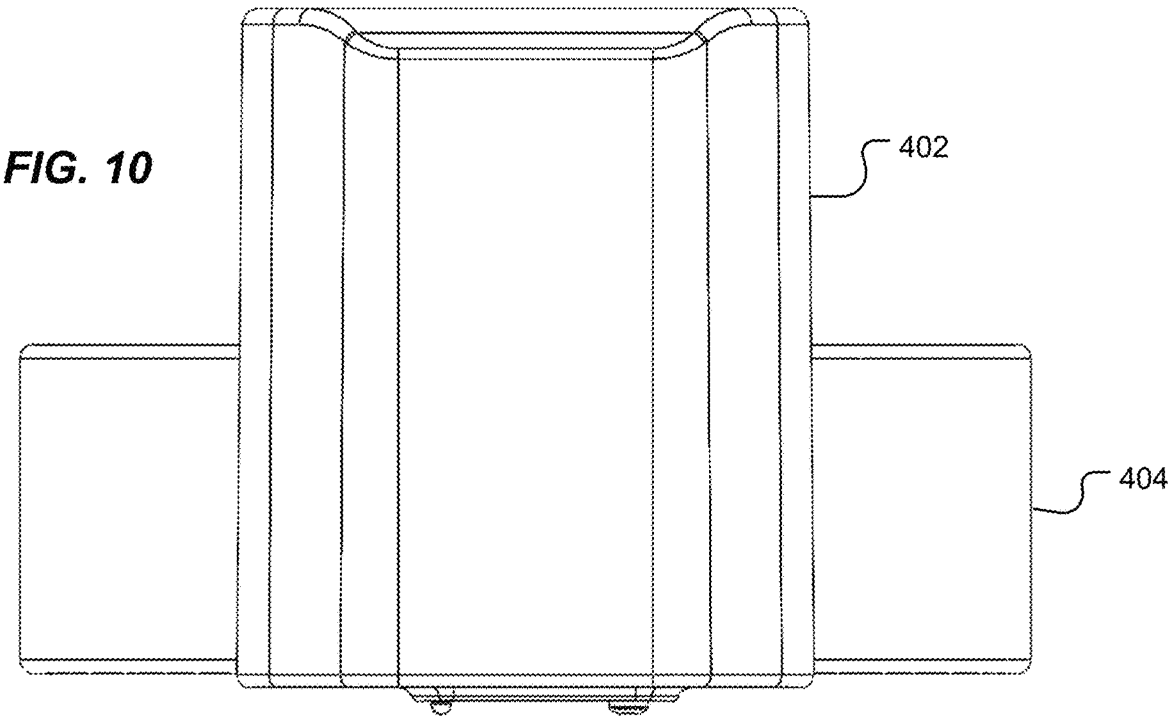
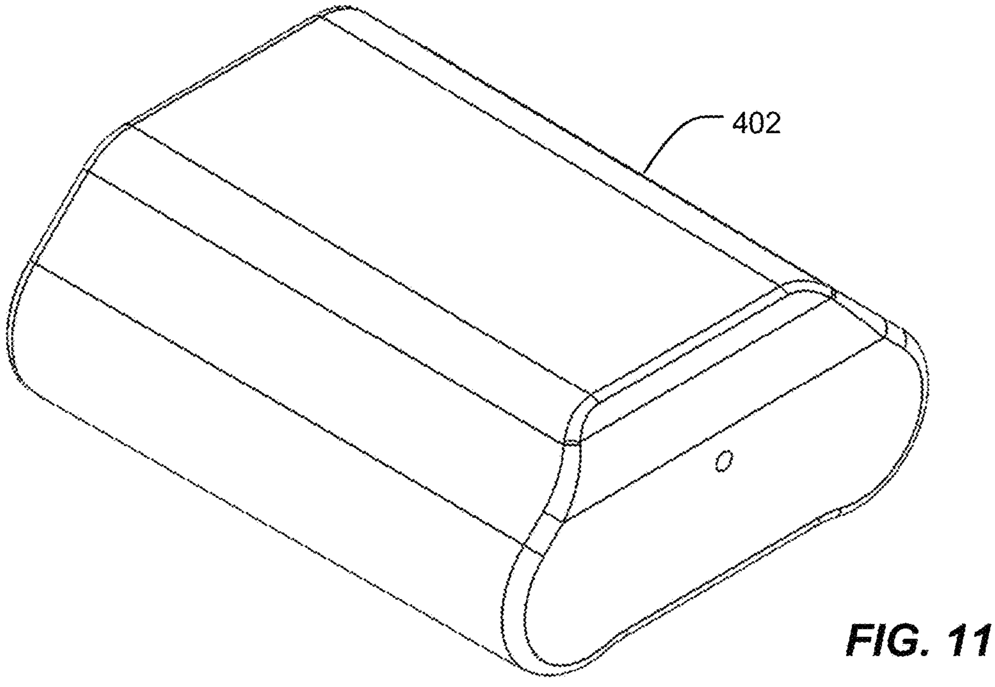
*FIG. 11*

FIG. 16
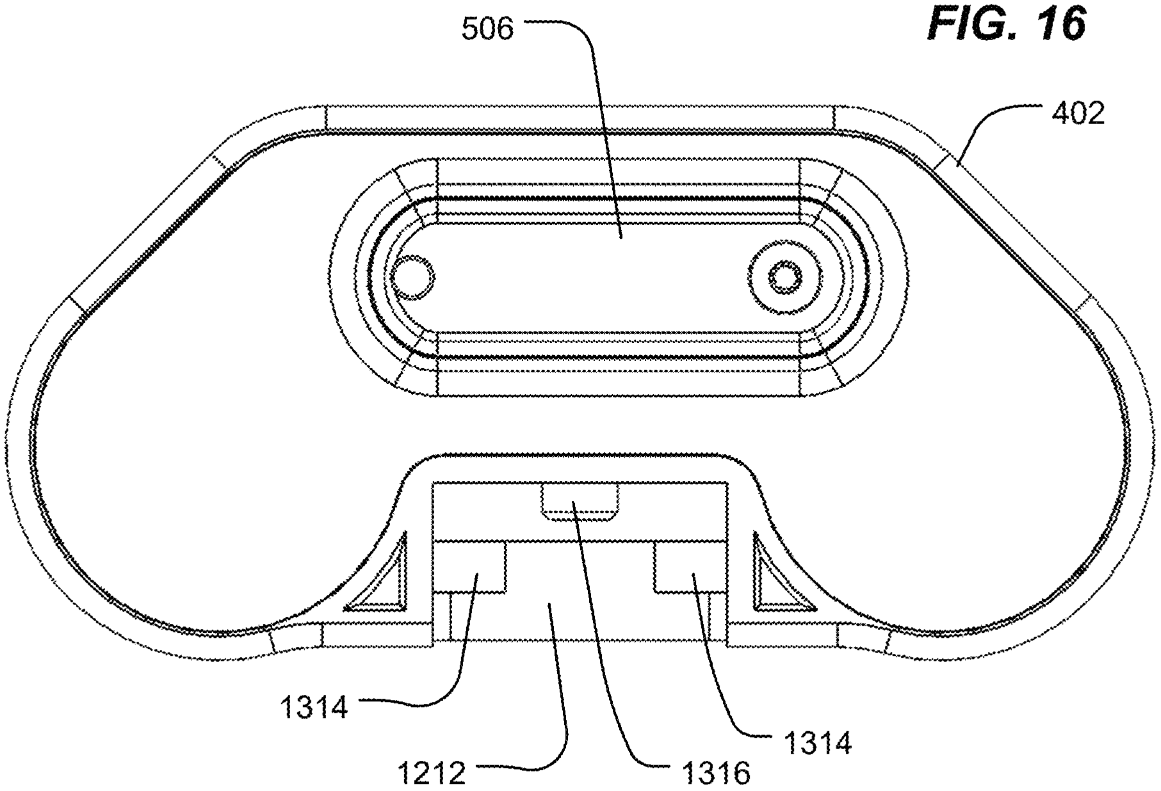
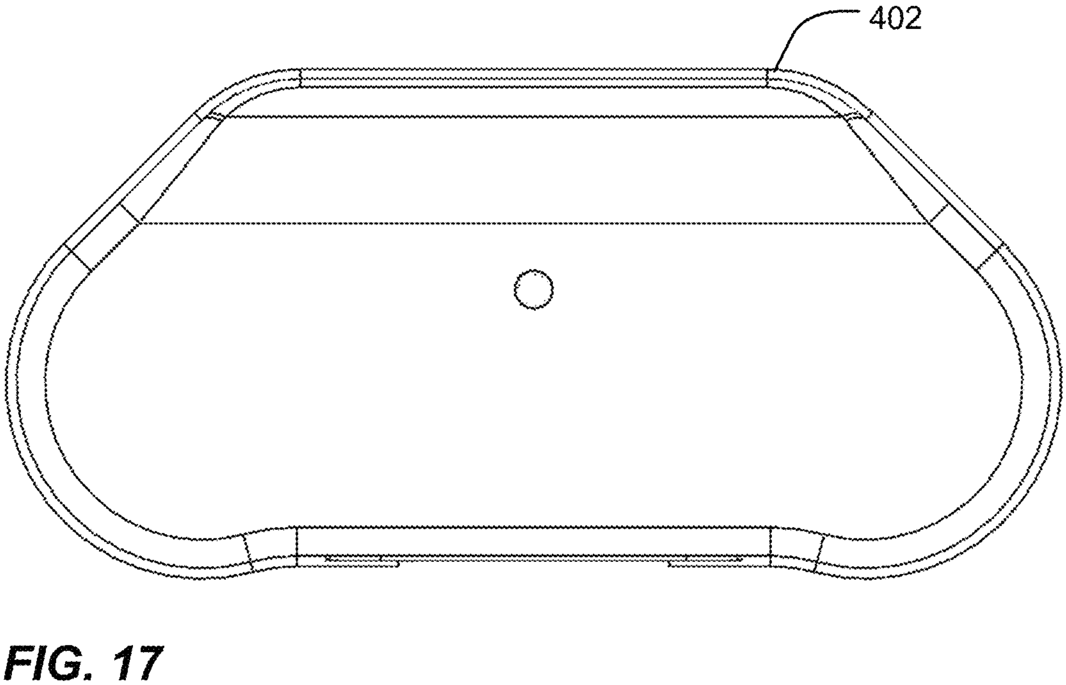
FIG. 17

PERSONAL TRACKING DEVICE

CROSS-REFERENCE TO RELATED APPLICATION(S)

This application claims benefit of U.S. Provisional Application No. 63/567,357, filed Mar. 19, 2024, which is incorporated herein by reference in its entirety.

FIELD OF THE DISCLOSURE

This disclosure relates to personal tracking devices.

BACKGROUND

Jails and prisons pose significant problems to local, state, and federal governments. Incarcerating offenders requires specialized facilities, trained security personnel, significant infrastructure to feed and clothe the offenders, and expensive medical care, leading to significant cost. Attempts to control such costs, such as through privatization, have led to allegations of profiteering and criticism of living conditions and overcrowding.

Moreover, in recent times, infectious diseases have become an issue in such facilities. Even prior to COVID, viruses, bacteria, and sexually transmitted diseases were endemic to incarcerated populations. With the advent of COVID, such issues with infectious disease are exacerbated.

As such, governments are turning to alternative methods to incarceration. For example, our governments are turning to house arrest or ankle monitors for nonviolent offenders. However, conventional ankle monitors have issues relating to location detection, data integrity, tampering, or providing sufficient warning of violations.

BRIEF DESCRIPTION OF THE DRAWINGS

The drawings accompanying and forming part of this specification are included to depict certain aspects of the disclosure. A clearer impression of the disclosure, and of the components and operation of systems provided with the disclosure, will become more readily apparent by referring to the exemplary, and therefore non-limiting, embodiments illustrated in the drawings, where identical reference numerals designate the same components. Note that the features illustrated in the drawings are not necessarily drawn to scale. The following is a brief description of the accompanying drawings:

FIG. 4, FIG. 5, FIG. 6, FIG. 7, FIG. 8, FIG. 9, and FIG. 10 include illustrations of an example wearable monitor.

FIG. 11, FIG. 12, FIG. 13, FIG. 14, FIG. 15, FIG. 16, FIG. 17, FIG. 18, and FIG. 19 include illustrations of an example base unit of an example wearable monitor.

The use of the same reference symbols in different drawings indicates similar or identical items.

DETAILED DESCRIPTION

Figure 1:
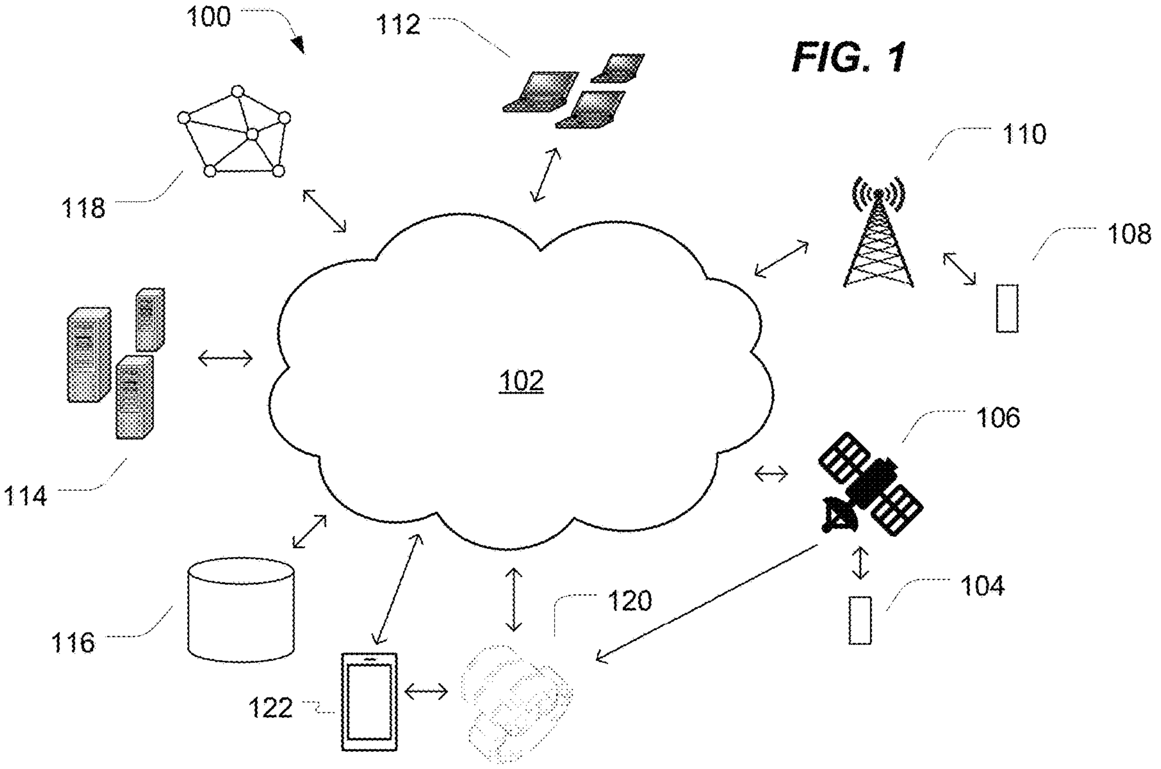
FIG. 1 includes an illustration of an example network for tracking a wearable monitor.

The disclosed embodiments should describe aspects of the disclosure in sufficient detail to enable a person of ordinary skill in the art to practice the invention. Other embodiments may be utilized, and changes may be made without departing from the disclosure. The following detailed description is not to be taken in a limiting sense, and the present invention is defined only by the included claims.

Specific implementations shown and described are only examples and should not be construed as the only way to implement or partition the present disclosure into functional elements unless specified otherwise in this disclosure. A person of ordinary skill in the art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Benefits, other advantages, and solutions to problems are shown and described with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In the following description, elements, circuits, and functions may be shown in block diagram form in order not to obscure the present disclosure in unnecessary detail. And block definitions and partitioning of logic between various blocks are exemplary of a specific implementation. It will be readily apparent to a person of ordinary skill in the art that the present disclosure may be practiced by numerous other partitioning solutions. A person of ordinary skill in the art would understand that information and signals may be represented using any of a variety of technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, where the bus may have a variety of bit widths, and the present disclosure may be implemented on any number of data signals including a single data signal.

The illustrative functional units include logical blocks, modules, and circuits described in the embodiments disclosed in this disclosure to emphasize their implementation independence more particularly. The functional units may be implemented or performed with a general-purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described in this disclosure. A general-purpose processor may be a microprocessor, any conventional processor, controller, microcontroller, or state machine. A general-purpose processor may be considered a special purpose processor while the general-purpose processor is configured to fetch and execute instructions (e.g., software code) stored on a computer-readable medium such as any type of memory, storage, and/or storage devices. A processor may also be implemented as a combination of computing devices, such as a combination of a DSP and a microprocessor, a plurality of microprocessors, one or more microprocessors in conjunction with a DSP core, or any other such configuration.

In addition, the illustrative functional units described above may include software or programs such as computer readable instructions that may be described in terms of a process that may be depicted as a flowchart, a flow diagram, a structure diagram, or a block diagram. The process may describe operational acts as a sequential process, many acts can be performed in another sequence, in parallel, or substantially concurrently. Further, the order of the acts may be rearranged. In addition, the software may comprise one or more objects, agents, threads, lines of code, subroutines, separate software applications, two or more lines of code or other suitable software structures operating in one or more software applications or on one or more processors. The software may be distributed over several code segments, modules, among different programs, and across several memory devices. Similarly, operational data may be identified and illustrated in this disclosure within modules and may be embodied in any suitable form and organized within any suitable data structure. The operational data may be collected as a single data set or may be distributed over different locations including over different storage devices. Data stated in ranges include each and every value within that range.

Elements described in this disclosure may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most discussed. For example, where feasible elements in FIG. 1 are designated with a format of 1xx, where 1 indicates FIG. 1 and xx designates the unique element.

Any reference to an element in this disclosure using a designation such as "first," "second," and so forth does not limit the quantity or order of those elements, unless such limitation is explicitly stated. Rather, these designations may be used in this disclosure as a convenient method of distinguishing between two or more elements or instances of an element. A reference to a first and second element does not mean that only two elements may be employed or that the first element must precede the second element. In addition, unless stated otherwise, a set of elements may comprise one or more elements.

Reference throughout this specification to "one embodiment," "an embodiment" or similar language means that a particular feature, structure, or characteristic described in the embodiment is included in at least one embodiment of the present invention. Appearances of the phrases "one embodiment," "an embodiment" and similar language throughout this specification may, but do not necessarily, all refer to the same embodiment.

In the following detailed description, reference is made to the illustrations, which form a part of the present disclosure, and in which are shown, by way of illustration, specific embodiments in which the present disclosure may be practiced. These embodiments are described in sufficient detail to enable a person of ordinary skill in the art to practice the present disclosure. However, other embodiments may be utilized, and structural, logical, and electrical changes may be made without departing from the true scope of the present disclosure. The illustrations in this disclosure are not meant to be actual views of any particular device or system but are merely idealized representations employed to describe embodiments of the present disclosure. And the illustrations presented are not necessarily drawn to scale. And elements common between drawings may retain the same or have similar numerical designations.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

As used in this disclosure, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Furthermore, the term "or" as used in this disclosure is generally intended to mean "and/or" unless otherwise indicated. For example, a condition A or B is satisfied by any one of the following: A is true (or present) and B is false (or not present); A is false (or not present) and B is true (or present); and both A and B are true (or present). As used in this disclosure, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description in this disclosure, the meaning of "in" includes "in" and "on" unless the context clearly dictates otherwise.

To aid any Patent Office and any readers of any patent issued on this disclosure in interpreting the included claims, the Applicant(s) wish to note that they do not intend any of the appended claims or claim elements to invoke 35 U.S.C. 112(f) unless the words "means for" or "step for" are explicitly used in that claim. Additionally, if any elements are specifically recited in means-plus-function format, then those elements are intended to be construed to cover the corresponding structure, material, or acts described in this disclosure or additional equivalents in accordance with 35 U.S.C. 112(f).

In an embodiment, a tracking system includes a wearable monitor or a personal tracking device in communication with one or more tracking servers. The wearable monitor or personal tracking device, such as an ankle monitor, can include a base that houses electronics for identifying a location of the wearer and for storing such location information and can include a bracelet or strap to secure the monitor to a wearer. Optionally, the wearable monitor may store location boundary information and compare location boundary information to the location of the wearer. The tracking system may further communicate with one or more cell phone applications, agent computers, authority servers, or databases, among others.

FIG. 1 includes an illustration of an example network 102 in communication with a wearable monitor 120, such as an electronic ankle monitor. The wearable monitor 120 can determine a location of a wearer and communicate the location through the network 102 to a set of tracking servers 114. In an example, the wearable monitor 120 can determine location based on global positioning systems, triangulation of cell towers, proximity to wireless networks, proximity to or in communication with a cell phone or smartphone 122, such as through Bluetooth®, or accelerometers, among others. In an example, the wearable monitor 120 can be in communication with a wearer's cell phone 122, such as through a wireless connection, for example Bluetooth® or Wi-Fi. The wearable monitor 120 can be in communication with the network using wireless protocols, such as a cell phone data network, for example, a broadband cellular network. In another example, a wearable monitor 120 can be in communication with the network 102 through Wi-Fi, SMS, satellite communications, Bluetooth®, or through proprietary methods.

The system 100 can include one or more tracking servers 114 that receive location information and optionally, other status information from the wearable device 120 or the wearer cell phone 122. The one or more tracking servers 114 can be in communication with databases 116 to store location data or information about the wearer or the wearable device 120. Further, the one or more tracking servers 114 can be in communication with an immutable storage system 118, such as a block chain storage system. In a particular example, the tracking servers 114 can implement a web-based interface or application, permitting setup, monitoring, and disconnection of a wearable monitor 120.

The one or more tracking servers 114 can be in communication with other computers 112, for example, used by agents to set up and track the wearable device 120 or authorities to monitor compliance. For example, agents can set up and track devices through a web-based application implemented on the tracking servers 114.

The one or more tracking servers 114 can be in communication with other mobile devices 108 through, for example, a cellular data network 110. In an example, other mobile devices can include devices of tracking agents, victims, or authorities. In addition, the one or more tracking servers 114 can be in communication with mobile devices 104 through satellite networks 106. For example, smartphone applications in communication with the tracking servers 114 can be implemented on smartphones associated with victims, agents, or authorities.

In general, the wearable monitor 120 communicates directly with the network 102. Alternatively, the wearable monitor can communicate with the mobile device 122, which in turn communicates with the network 102. For example, the mobile device 122 can include an application that monitors the performance of the wearable monitor 120 and transmits such information through the network 102 to the one or more tracking servers. In an example, the mobile device 122 is a smartphone implementing a smartphone application. The smartphone application can provide notifications associated with functionality of the device, battery life, upcoming events, or boundary violations, among other functions. The smartphone application can further be used to check the presence of the wearer assigned to the smartphone or electronic ankle monitor, for example, by taking a picture or facial recognition.

Figure 2:
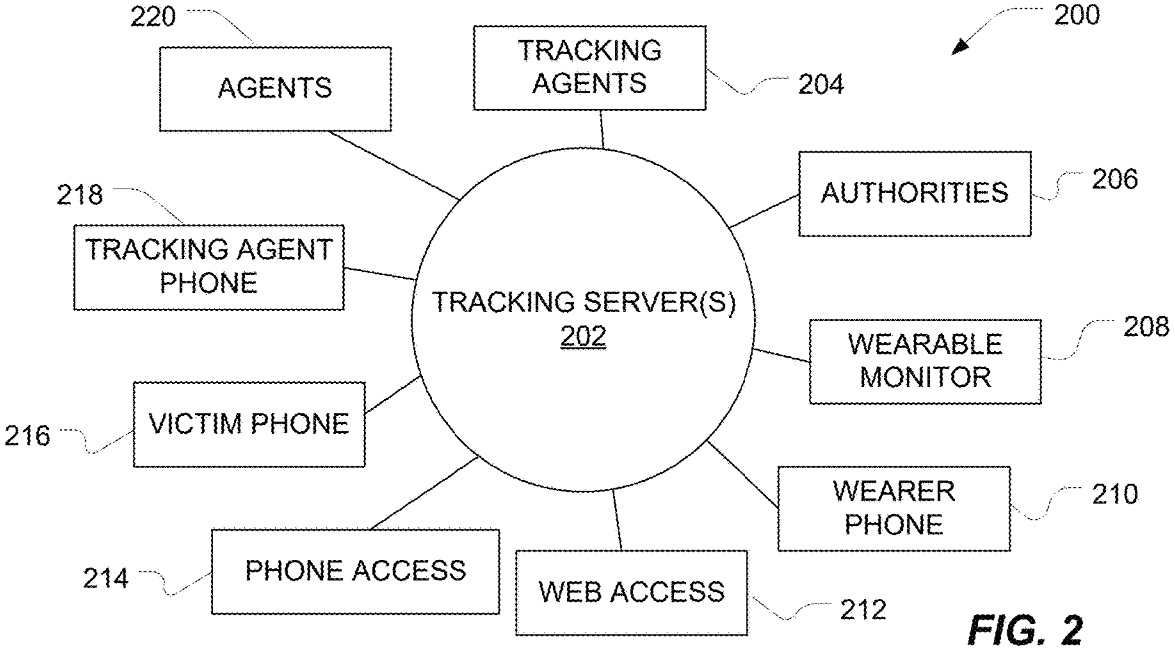
FIG. 2 includes an illustration of an example tracking system.

FIG. 2 includes an illustration of a tracking system 200 that includes one or more tracking servers 202 in communication with a wearable monitor 208, such as an ankle monitor. Tracking servers 202 can be in communication with agent devices 220. For example, a bail bonds agent or an authority agent can associate a wearable monitor 208 with a wearer. The agent devices 220 can be used to enter information about the offender, payment methods, identification of the wearable monitor, or location boundaries to be associated with the wearable monitor. Optionally, key dates, such as court appearance, dates, bond amounts, next of kin information, addresses, work addresses, victim addresses, cell phone numbers, or identifiers, pictures of the wearer, or state issued identification numbers, among others.

Tracking servers 202 can also be in communication with tracking agent devices 204. For example, once the wearable monitor 208 is in the field being worn by an alleged offender, tracking agents may monitor the location of the offender, or a status of the device. Tracking agents 204 can contact the wearer in the case of a change in status of the device or can contact bond or parole agents in charge of the offender. In the event of boundary violations, the tracking agents 204 can optionally contact authorities based on boundary violations or a change in status of the wearable monitor. For example, the tracking servers 202 can provide a web-based application for accessing and providing information.

In addition, the tracking servers 202 can be in communication with authorities 206. For example, the tracking servers 202 can provide authorities with location information, a history of locations of the wearable monitor, notification of boundary violations, notification of a change in status of the wearable monitor, such as tampering with the device, or information associated with the agents 220.

In another example, the tracking servers 202 can be in communication with a wearer's phone application 210. For example, the tracking servers can communicate with the wearer through the wearer phone application. Such a phone application may provide alerts to a wearer of a change in status of the wearable monitor or a boundary violation. Further, the tracking servers 202 can provide alerts to the phone application 210 regarding key dates for court appearance. In a further example, the tracking servers 202 can permit payment through the wearer's phone application 210. In an additional example, a wearer may utilize the wearer phone application to notify the tracking servers 202 of issues with monitoring the wearable monitor 208, such as issues of discomfort, failure to charge, incorrect readings, or other matters.

In a further example, the tracking servers 202 can provide web access 212. For example, payments can be made through web access 212 or a history of locations can be provided to the wearer. Further, the wearer can make appointments for device maintenance either through the web access 212 or through the wearer's phone application 210.

The alleged offender may further be able to access or attend hearings or other meetings utilizing voice or video conferencing through the wearer's phone application 210 or the web access 212. In another example, the wearer's phone application 210 may permit a wearer to take pictures of themselves and confirm proximity to the wearable monitor 208. For example, the wearable monitor 208 may be in communication with the wearer's phone application through Bluetooth®, such as low energy Bluetooth®. The wearer can take a picture of themselves, and the phone application 210 can confirm proximity to the wearable monitor 208 and provide the picture to provide confirmation to the tracking servers 202. Optionally, the wearer phone application 210 or the tracking servers 202 can use facial recognition to confirm the identity of the alleged offender based on the picture.

Optionally, the tracking servers 202 can provide traditional phone access 214, such as through a landline in a touch tone system. Various services such as taking payments, providing tracking information, providing key dates, or providing other information can be accessed through the phone access 214.

In some circumstances, victims may have the right to know when an alleged offender is in proximity to them. In such a case, the tracking servers 202 may communicate with a victim phone application 216 to indicate whether the alleged offender is in proximity to the victim. The victim phone application 216 may provide the victim with options to change notification methods, test operability of the system, updated personal information, or track key dates associated with the court appearances.

In another example, the tracking servers 202 may communicate with a tracking application of the mobile device 218. For example, if an alleged offender violates boundaries or skips bail, a licensed individual or the authorities may seek to track down the alleged offender and may use such a tracking application 218 on a mobile device. Such tracking application 218 may further permit the licensed individual to contact authorities once the alleged offender has been located and identified. In other examples, such a tracking application may allow the licensed individual to take pictures of the alleged offender or key evidence to provide to authorities to assist with locating and apprehending the alleged offender.

Figure 3:
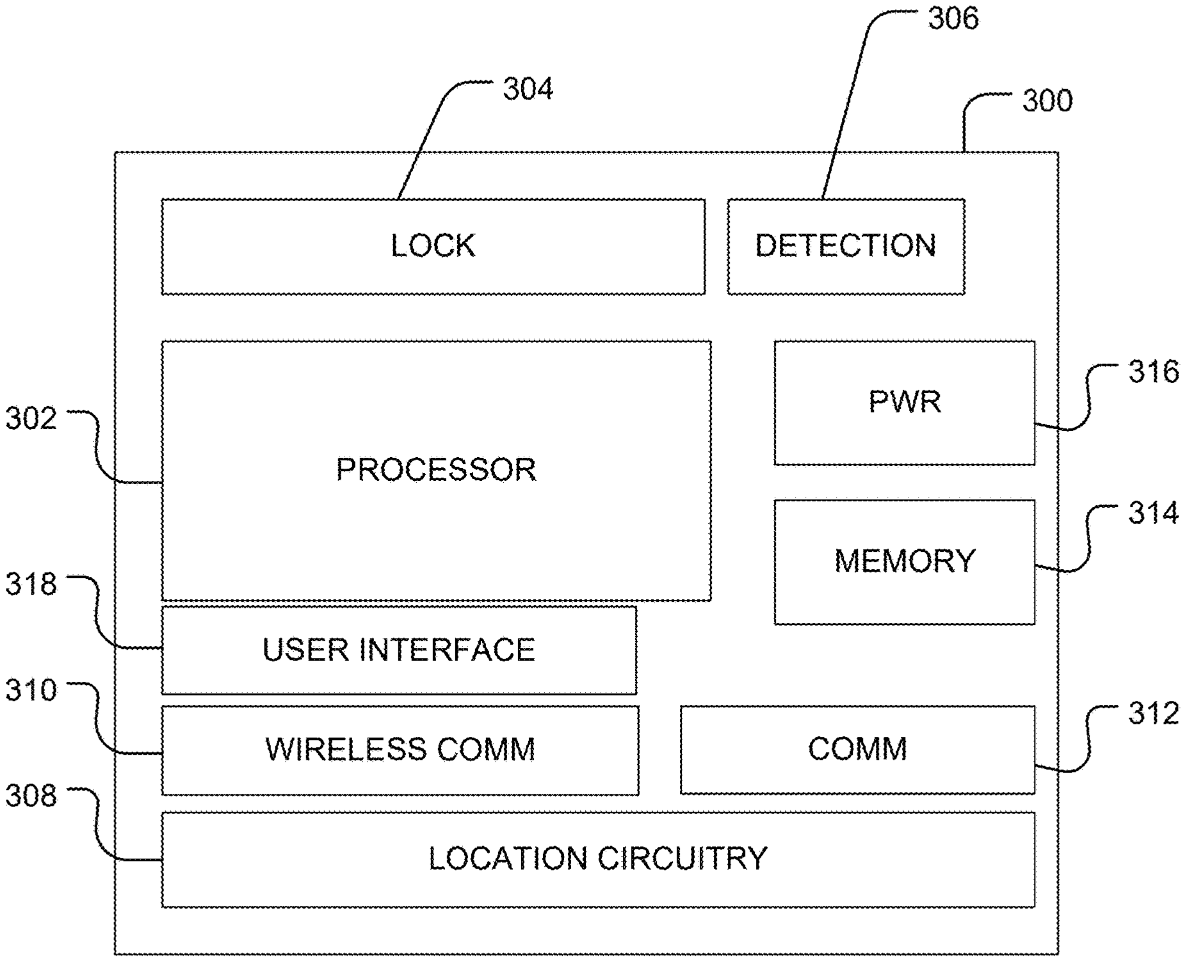
FIG. 3 includes an illustration of an example wearable monitor circuitry.
Figure 4:
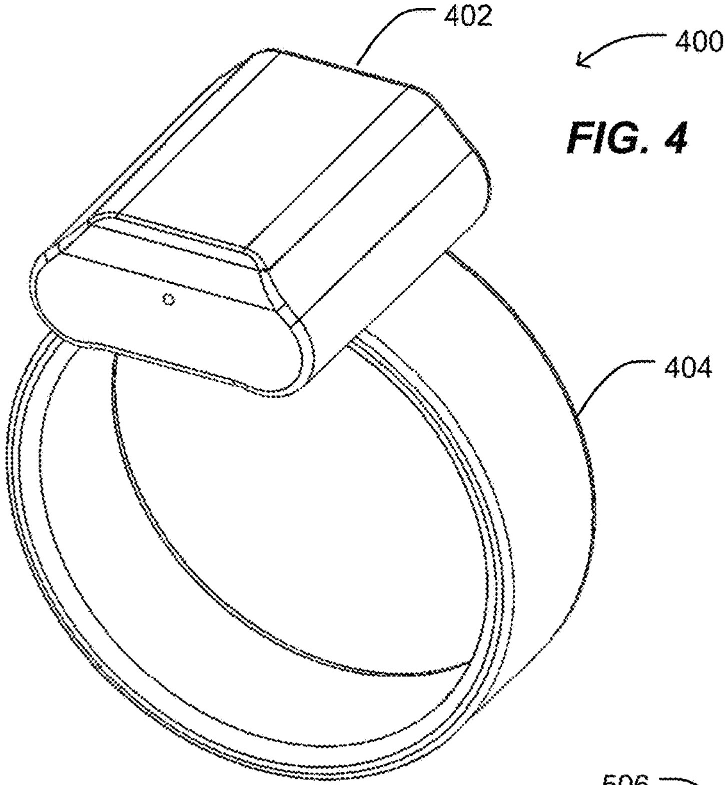

FIG. 3 includes an illustration of example circuitry 300 associated with a wearable monitor. In an example, the circuitry 300 includes a processor 302. The processor 302 can be in communication with a locking mechanism 304 and a detection mechanism 306. For example, the locking mechanism 304 can secure an end of a strap that wraps around an appendage of the wearer to secure the wearable monitor to the wearer. In conjunction with the strap, the detection circuitry 306 can determine whether the strap remains intact or whether tampering has occurred.

The processor 302 is in communication with a location circuitry 308. For example, the location circuitry 308 can determine a location of the wearable monitor. In an example, the location circuitry 308 can use global positioning system (GPS) circuitry to determine location. In another example, the location circuitry 308 can include accelerometers to determine location. In additional examples, the location circuitry 308 can include triangulation circuitry for determining location based on cell phone networks, Wi-Fi networks, Bluetooth® networks, or other wireless networks. In a particular example, the location circuitry 308 utilizes a global positioning system to determine location and further utilizes accelerometers to determine location if a signal from the global positioning system is lost. Other triangulation circuitry can further be used as backup information to confirm the GPS location or that location determined by the accelerometers.

The processor 302 can be in communication with a wireless communication circuitry 310. In an example, the processor 302 can communicate to tracking servers or to authorities' location information about the wearable monitor, a status of the wearable monitor, such as power levels, tamper detection, strength of signal, or self-diagnostic information. In an example, the wireless communication circuitry 310 permits communication with a broadband cellular data network. In another example, the wireless communication circuitry 310 permits communication using standards such as Bluetooth®, Wi-Fi, SMS, or cellular voice network, among others.

The processor 302 can further be in communication with a wired communication circuitry 312. In an example, the processor 302 may communicate with computers or other equipment using a physical connection through the wired communication circuitry 312. In an example, an agent can utilize a wired connection through the wired communication circuitry 312 to program the processor or download data. In another example, archive data may be uploaded from the wearable device using the wired communication circuitry 312. In an example, the wired communication circuitry 312 can be a serial bus communication circuitry, such as a USB port. In another example, the wired communication circuitry 312 can use Thunderbolt™ or Firewire™. Alternatively, the wired communication circuitry 312 can utilize a proprietary method.

The processor 302 can further be in communication with a power supply 316, such as a battery or capacitor. In an example, the power supply 316 may be charged with the wired communication circuitry 312, such as using a powered USB port, Thunderbolt™ port, or Firewire™ port.

Further, the processor 302 can be in communication with memory 314. For example, the memory 314 can include instructions operable by the processor 302 to perform the operations of the wearable monitor. In another example, location data can be stored in the memory 314 for later retrieval and communication through the wireless communication circuitry 310 or the wired communication circuitry 312. Further, location boundaries may be stored in the memory 314. Such boundaries can be referenced by the processor 302 and compared to locations determined by the location circuitry 308. In the event of boundary violations, the processor 302 can communicate an alert through the wireless communication circuitry 310 to remote tracking servers. In another example, the processor 302 can communicate violations or status to a user through user interfaces 318.

For example, the user interface 318 can include lights, such as LEDs. In another example, the user interface 318 can include a speaker. Accordingly, the processor 302 may communicate alerts to the wearer of the wearable monitor through visual or auditory signals.

Figure 5:
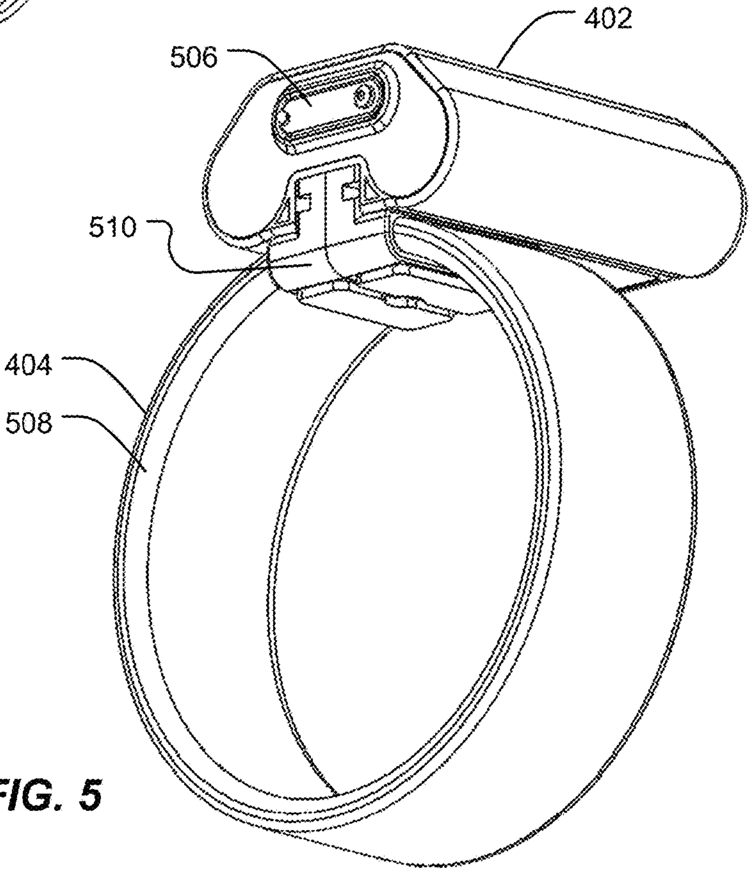
Figure 6:
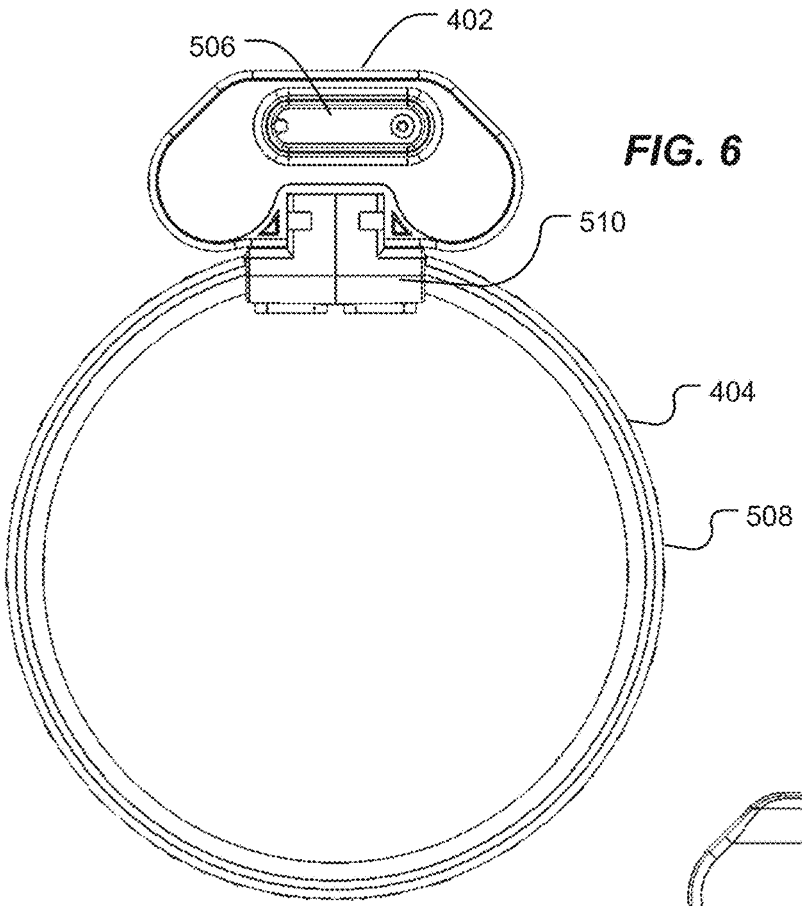
Figure 7:
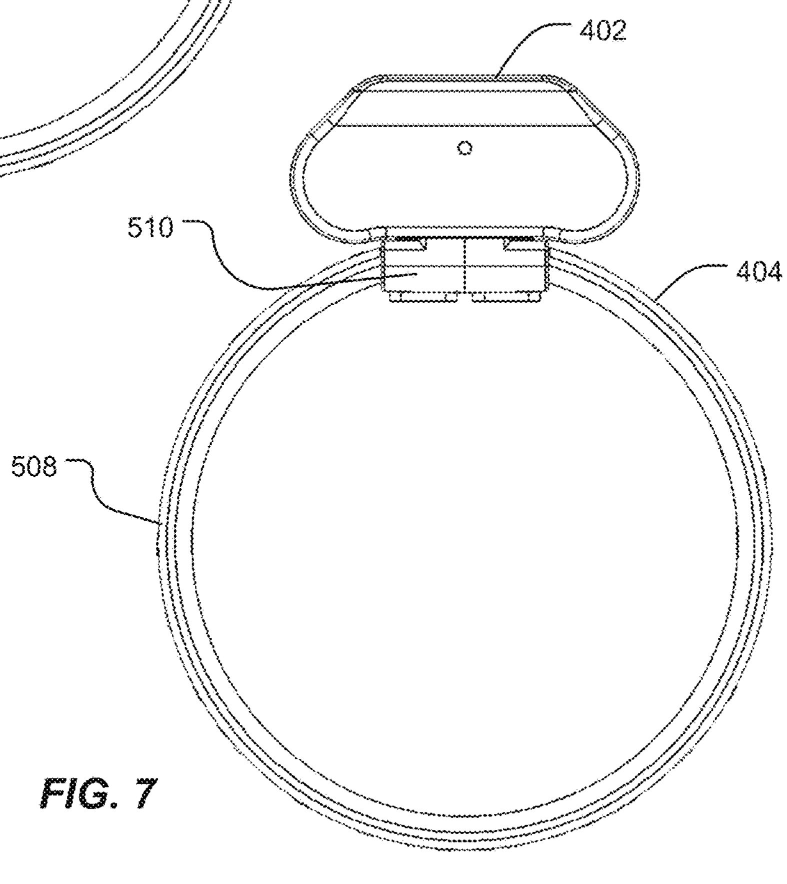
Figure 8:
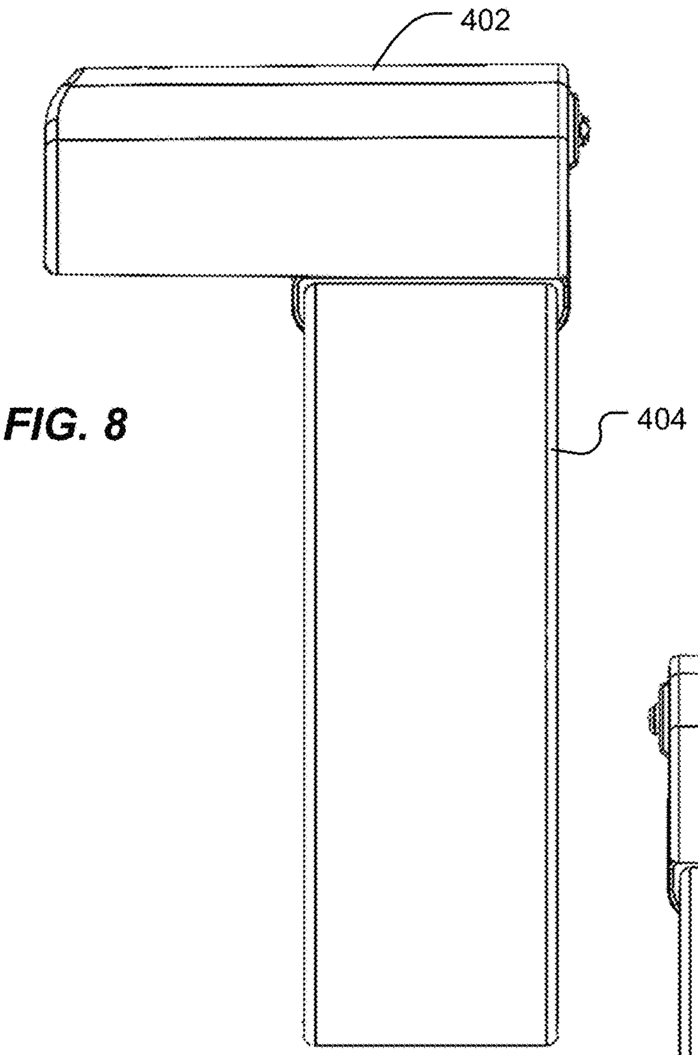
Figure 9:
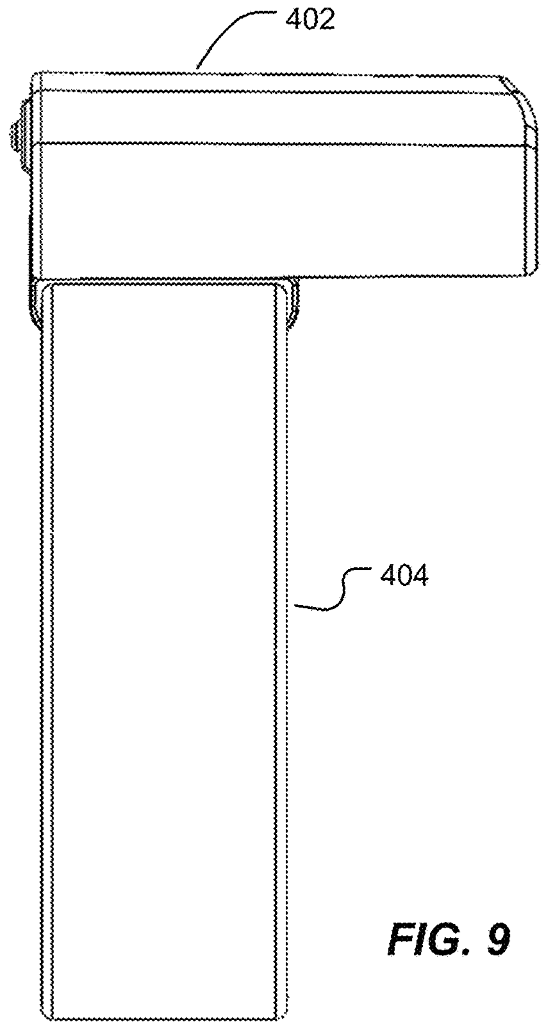

FIG. 4, FIG. 5, FIG. 6, FIG. 7, FIG. 8, FIG. 9, and FIG. 10 include illustrations of an example personal tracking device 400, such as an ankle monitor. The personal tracking device 400 includes a base unit or head 402 and a bracelet 404. The bracelet 404 can include a strap 508 and a connector 510 that attaches to the base unit 402. As illustrated in FIG. 5 and FIG. 6, the head 402 includes an interface 506. In an example, the interface 506 can include a USB interface, various indicator lights, or a speaker.

Figure 12:
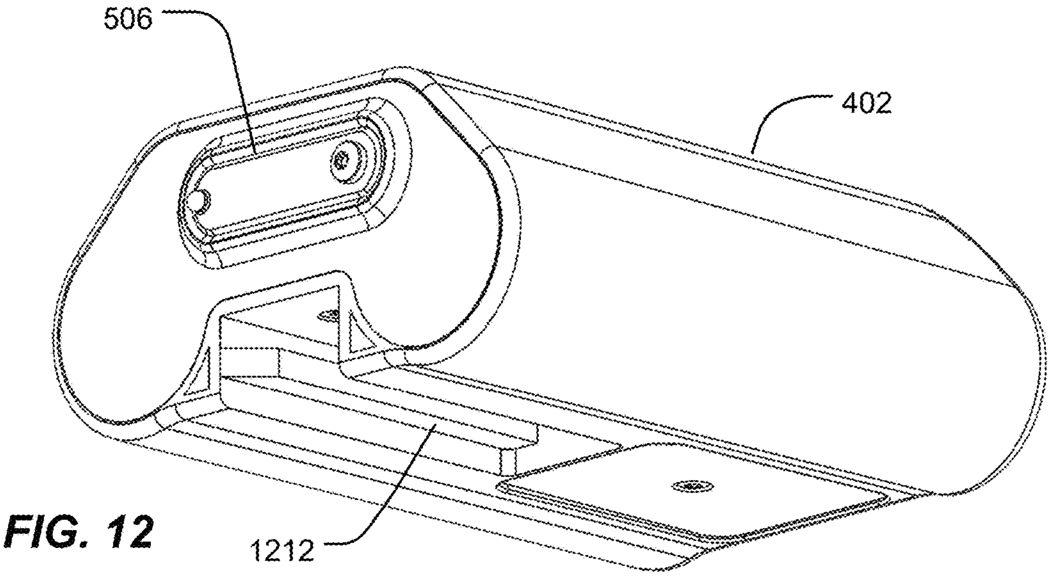

The base unit 402 is further illustrated in FIG. 11, FIG. 12, FIG. 11, FIG. 13, FIG. 14, FIG. 15, FIG. 17, FIG. 18, and FIG. 19. FIG. 11 illustrates a perspective view of the top of the base unit 402. FIG. 12 illustrates a perspective bottom view of the base unit 402. As illustrated in FIG. 12, the base unit 402 includes the interface 506 and a connector interface 1212 to which the interface connector 510 of the bracelet 404 can connect.

Figure 13:
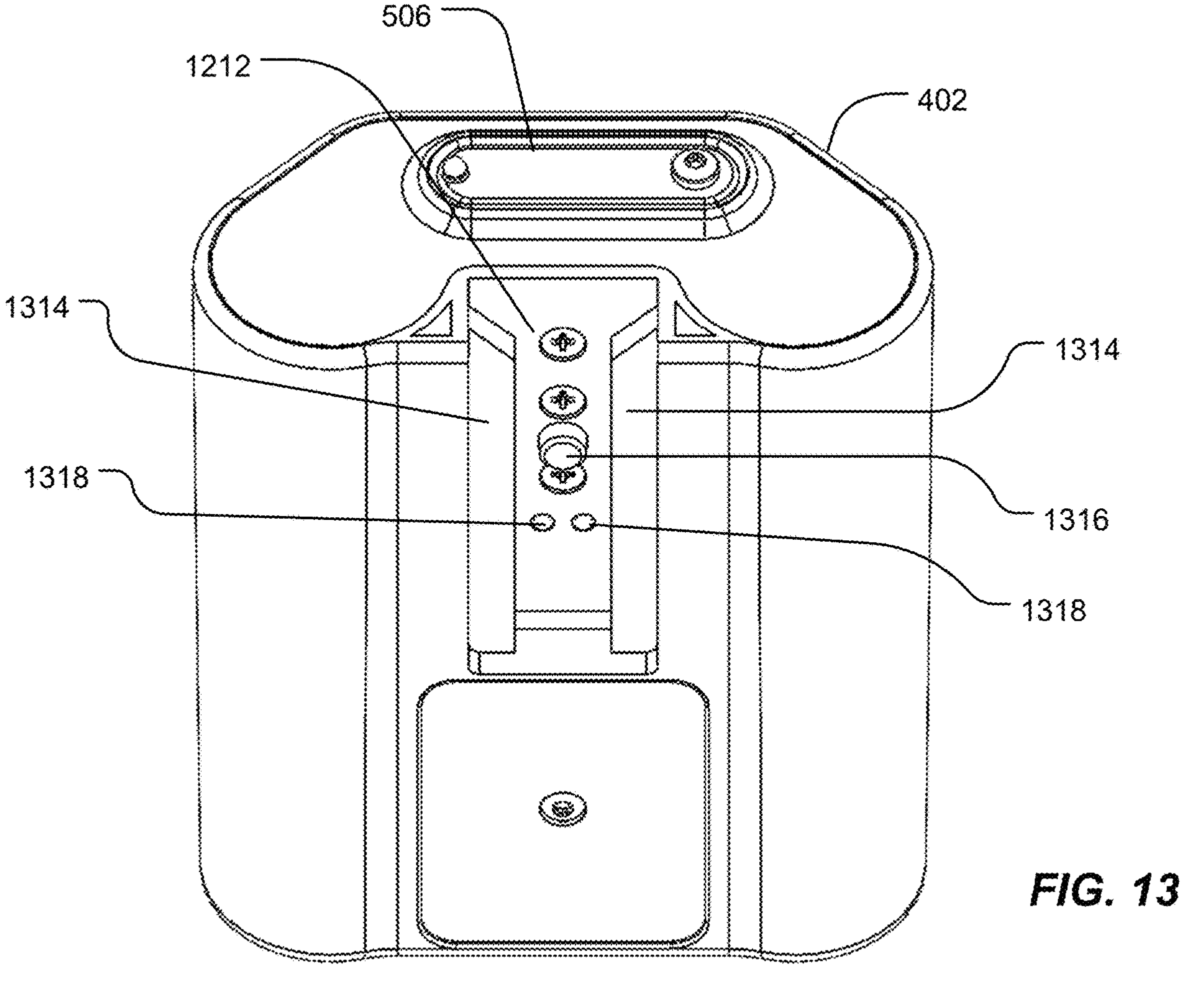
Figure 14:
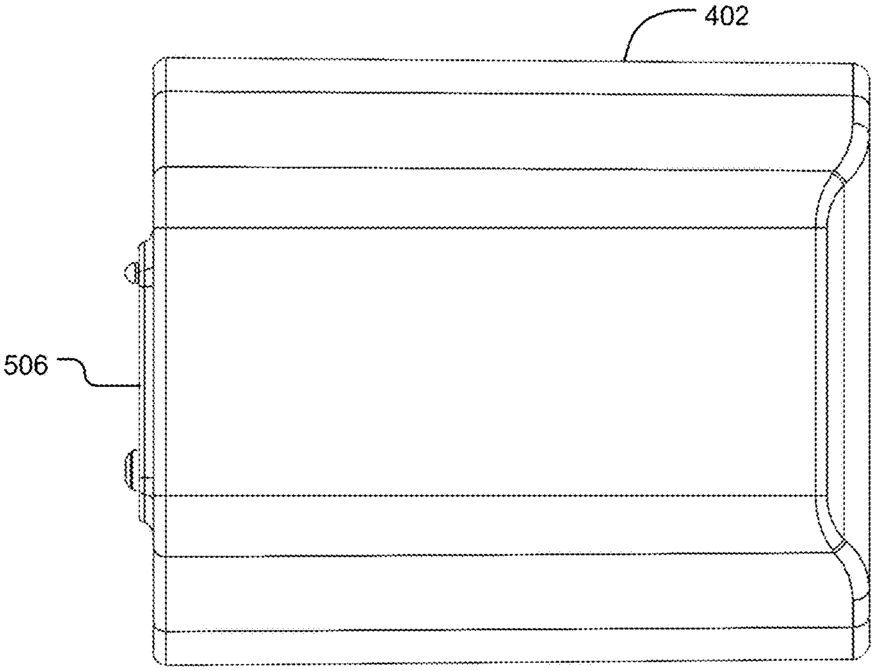
Figure 15:
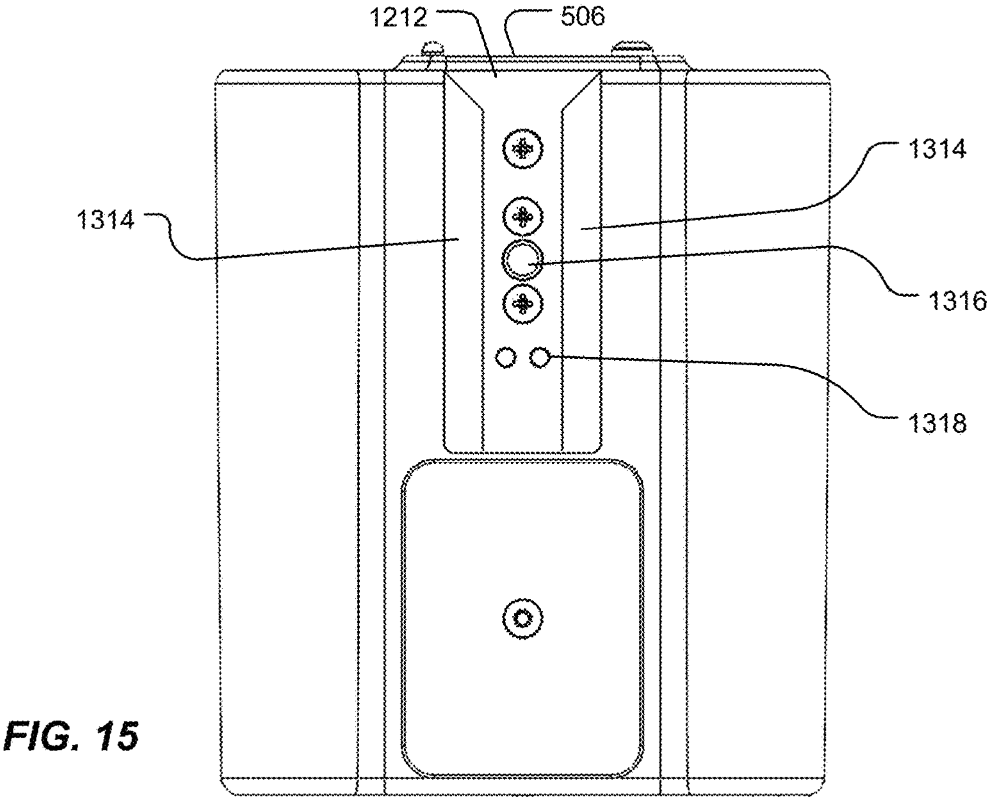
Figure 18:
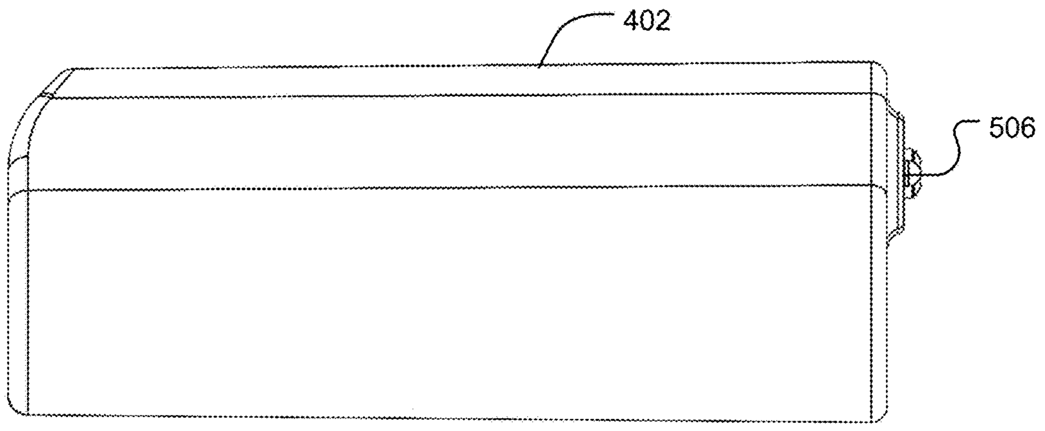
Figure 19:
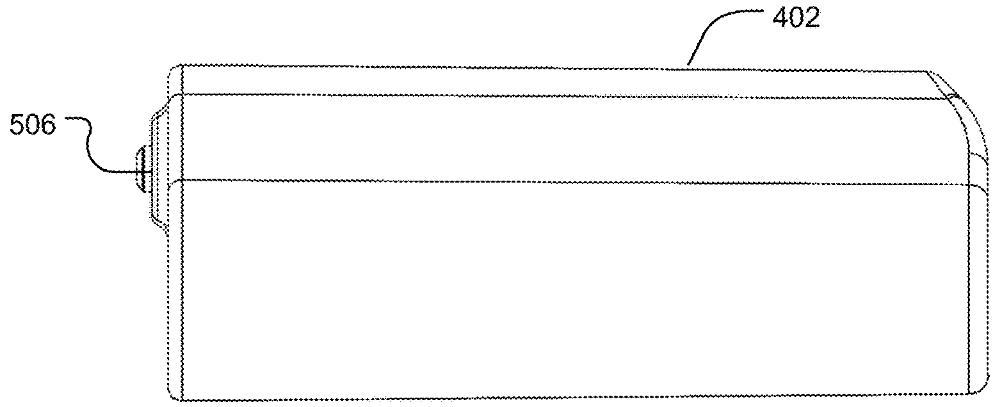

As illustrated in FIG. 13, the connector interface 1212 includes rails 1314 on either side of the interface that can interact with guides associated with the interface connector 510 of the bracelet 404. The connector interface 1212 further includes a movable pin 1316 to lock the interface connector 510 of the bracelet 404 into place. In addition, the connector interface 1212 can include an electronic interface 1318 to electrically connect to a circuit of the bracelet 404.

FIG. 20, FIG. 21, FIG. 22, FIG. 23, FIG. 24, and FIG. 25 illustrate the bracelet 404 when the end components 2020 and 2022 are connected, forming a bracelet around a leg, for example. FIG. 26, FIG. 27, FIG. 28, FIG. 29, FIG. 30, FIG. 31, FIG. 32, FIG. 33, FIG. 34, and FIG. 35 illustrate the bracelet in its extended or flat form, a configuration in which the end components 2020 and 2022 are not attached to each other.

Figure 20:
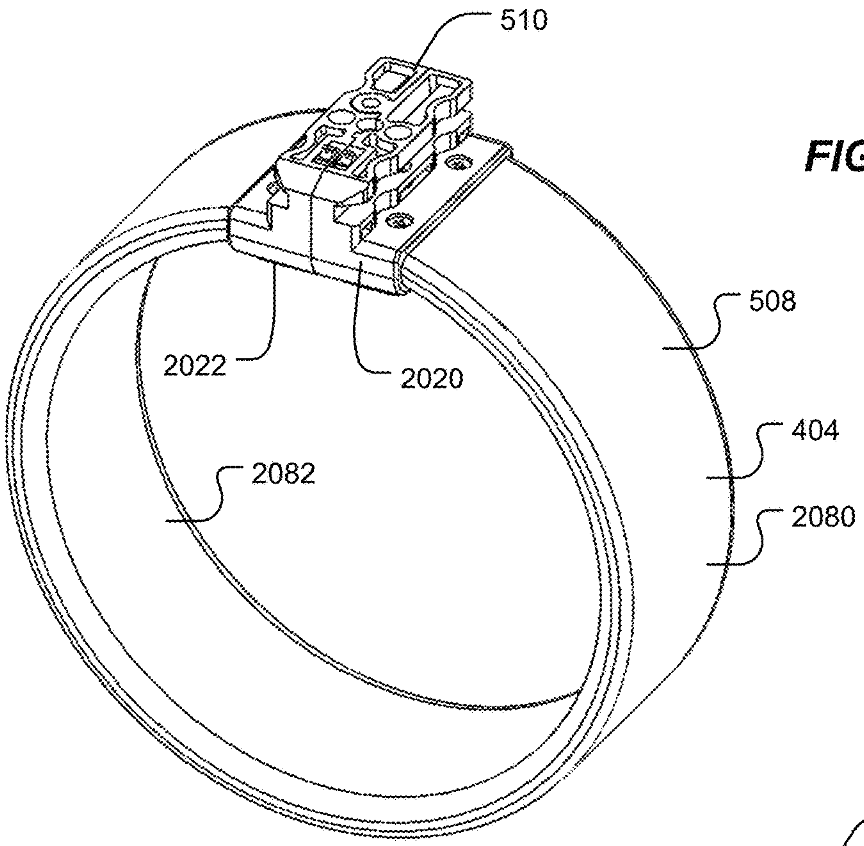
FIG. 20, FIG. 21, FIG. 22, FIG. 23, FIG. 24, and FIG. 25 include illustrations of example bracelet for use with a wearable monitor.
Figure 21:
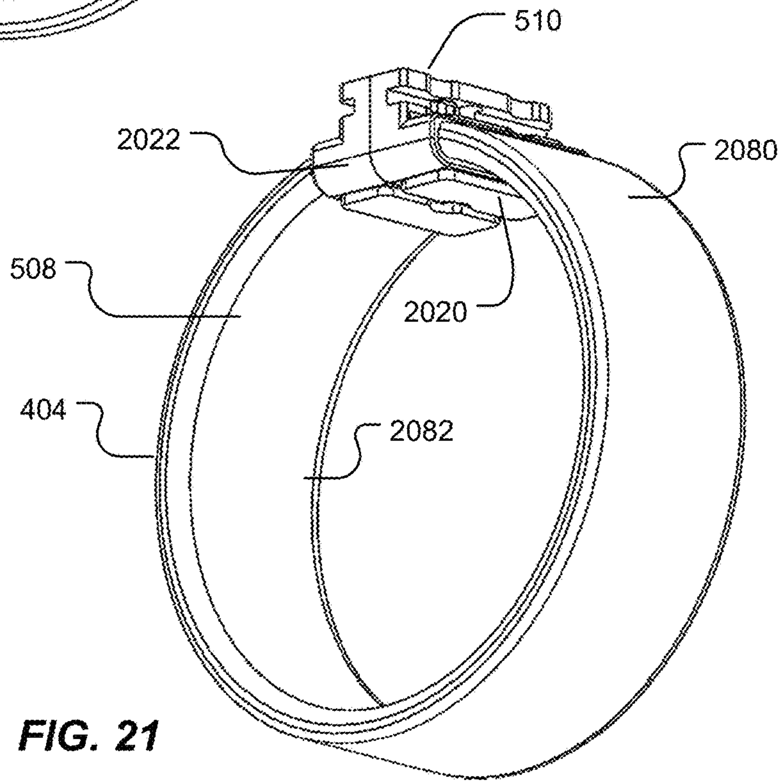
Figure 22:
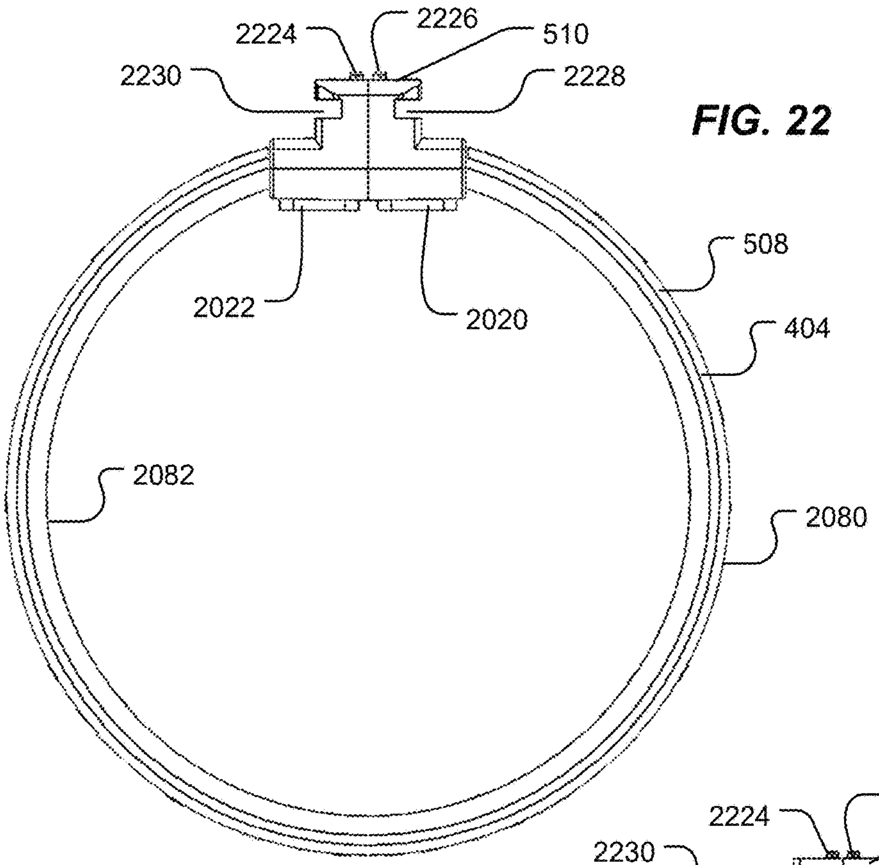

In its enclosed configuration illustrated in FIG. 20, the end components 2020 and 2022 are locked together to form the interface connector 510 of the bracelet 404. In such a configuration, a strap 508 of the bracelet 404 forms an outward facing surface 2080 and an inward facing surface 2082. As illustrated in FIG. 22, when the end components 2020 and 2022 are connected to form the connector 510, the structure of the connector 510 extends radially outward from the outward facing surface 2080 of the bracelet 404. The connector 510 includes guides 2228 and 2230 formed on respective ends 2020 and 2022 to interact with the rails 1314 of the interface 1212 of the base unit 402. The guides 2228 and 2230 can extend parallel to the outward facing surface 2080 of the bracelet 404.

Figure 23:
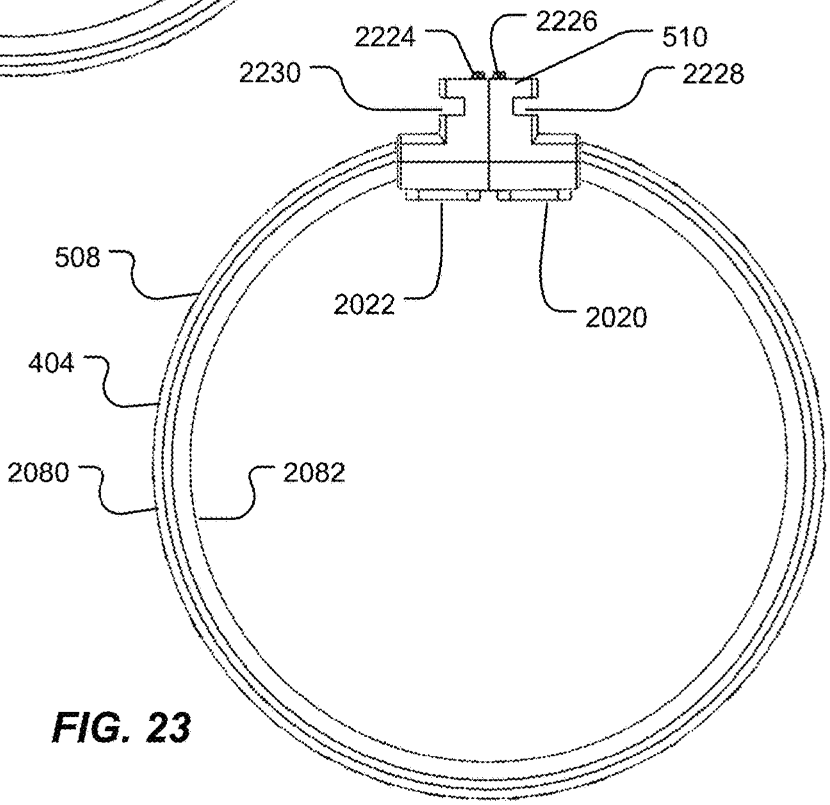

In the enclosed configuration, the interface connector 510 includes electrical connectors 2224 and 2226 that interact with the electrical connectors 1318 of the connector interface 1212 of the base unit 402, as illustrated in FIG. 22 and FIG. 23. The electrical connectors 2224 and 2226 are in communication with a circuit, such as a tamper detection circuit, disposed within the strap 508.

Figure 24:
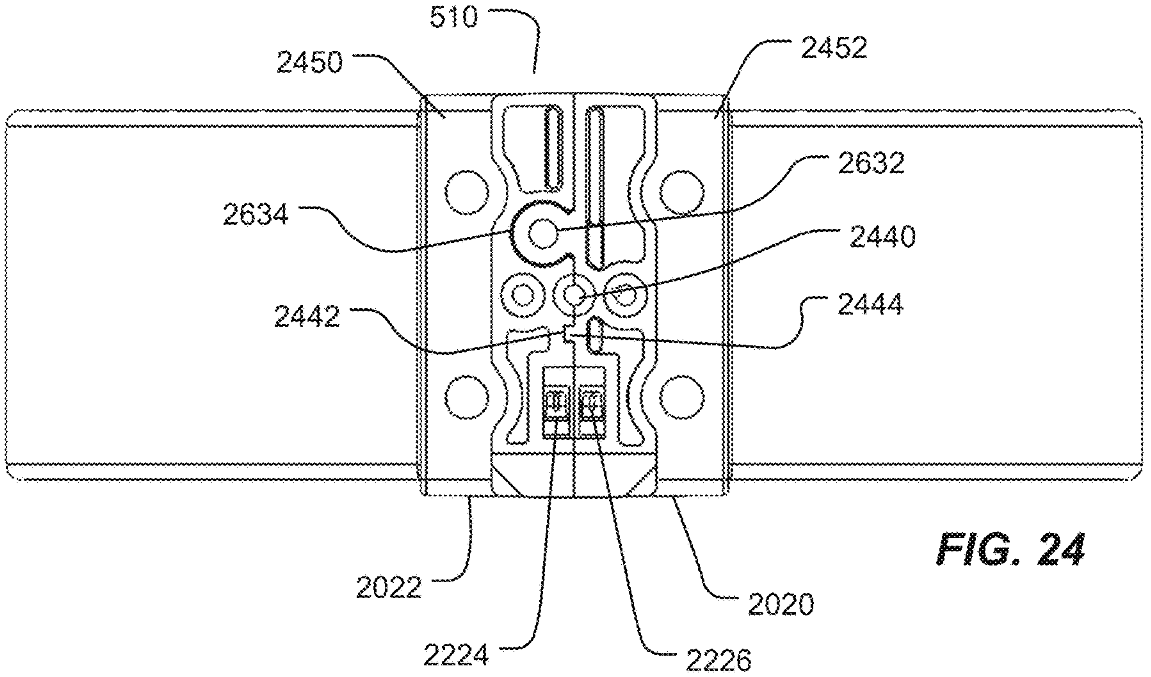
Figure 25:
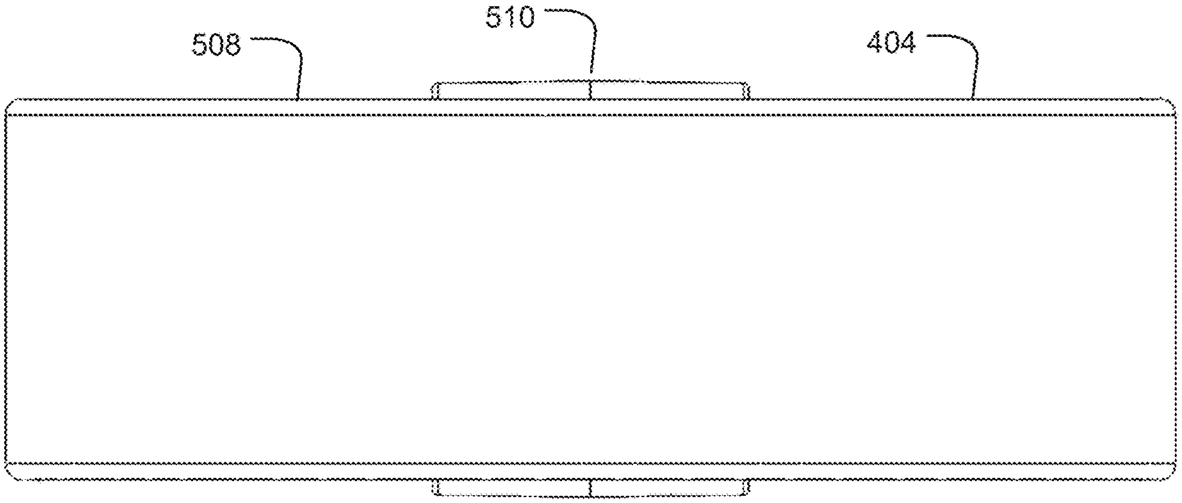

As illustrated in FIG. 24, the interface connector 510 is formed by the interlocking of the end component 2020 with the end component 2022 of the bracelet 404. In particular, the end component 2020 can include an interjamb 2632 that, in the enclosed configuration extends radially outward from the surface 2080. The interjamb 2632 can fit within a blank 2634 of the end component 2022 that also extends radially outward from the outer surface 2080 of the bracelet 404. The interjamb 2632 can be cylindrical in shape and extend outward perpendicular from the outward facing surface 2080 in the flat configuration or radially outward from the surface 2080 in the enclosed configuration. In an example, the blank 2634 is also cylindrical in shape to receive the interjamb 2632 and extends radially outward from the outward facing surface 2080 in the enclosed configuration. Alternatively, the interjamb 2632 can have a prismatic shape or have a polygonal cross-section, and the blank 2634 can have a complementary shape. The interjamb 2632 can extend partially across the height of the end component 2020 or the full height of the end component 2020.

When the end components 2020 and 2022 are interconnected, they formed an opening 2440 into which a lock pen, such as the locking pin 1316 of the base unit 402, can engage. The end component 2020 and end component 2020 can further form a rail 2444 that extends radially outward from the outward facing surface 2080 and the end component 2022 can include a corresponding guide 2442 to receive the rail 2444. As illustrated, the rail has a rectangular cross section. Alternatively, the rail can have a polygonal or circular cross section.

The end component 2020 includes an electrical connector 2226 and the end component 2022 includes an electrical connector 2224, each connecting to respective sides of an internal circuitry within the bracelet 404. When the end components 2020 and 2022 are interconnected, electrical connections are 2224 and 2226 are adjacently disposed and positioned for connection with the electrical connectors 1318 of the base unit 402.

Figure 26:
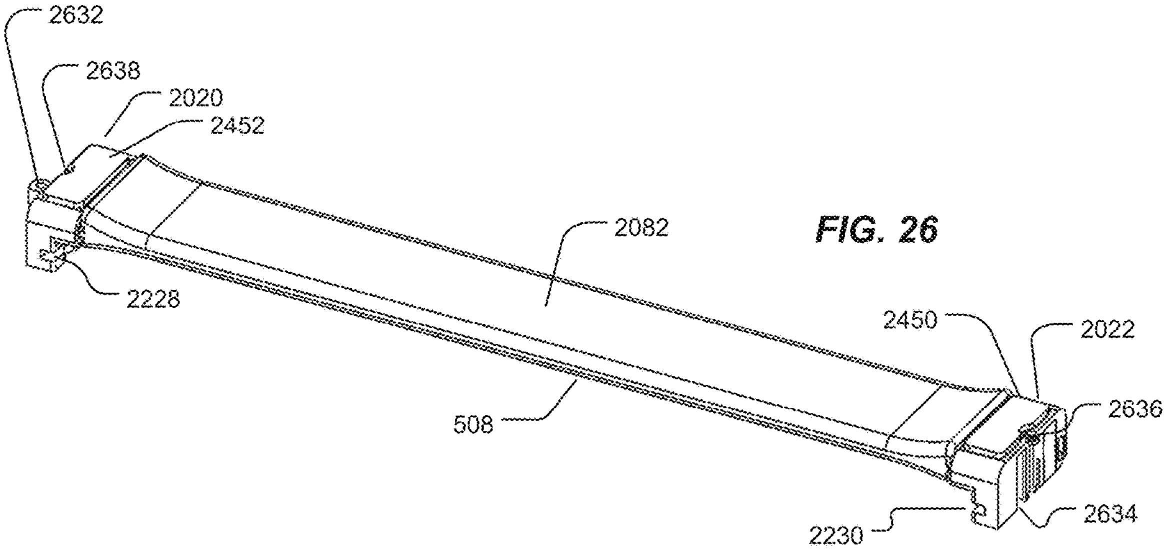
FIG. 26, FIG. 27, FIG. 28, FIG. 29, FIG. 30, FIG. 31, FIG. 32, FIG. 33, FIG. 34, and FIG. 35 include illustrations of example bracelet for use with a wearable monitor.
Figure 27:
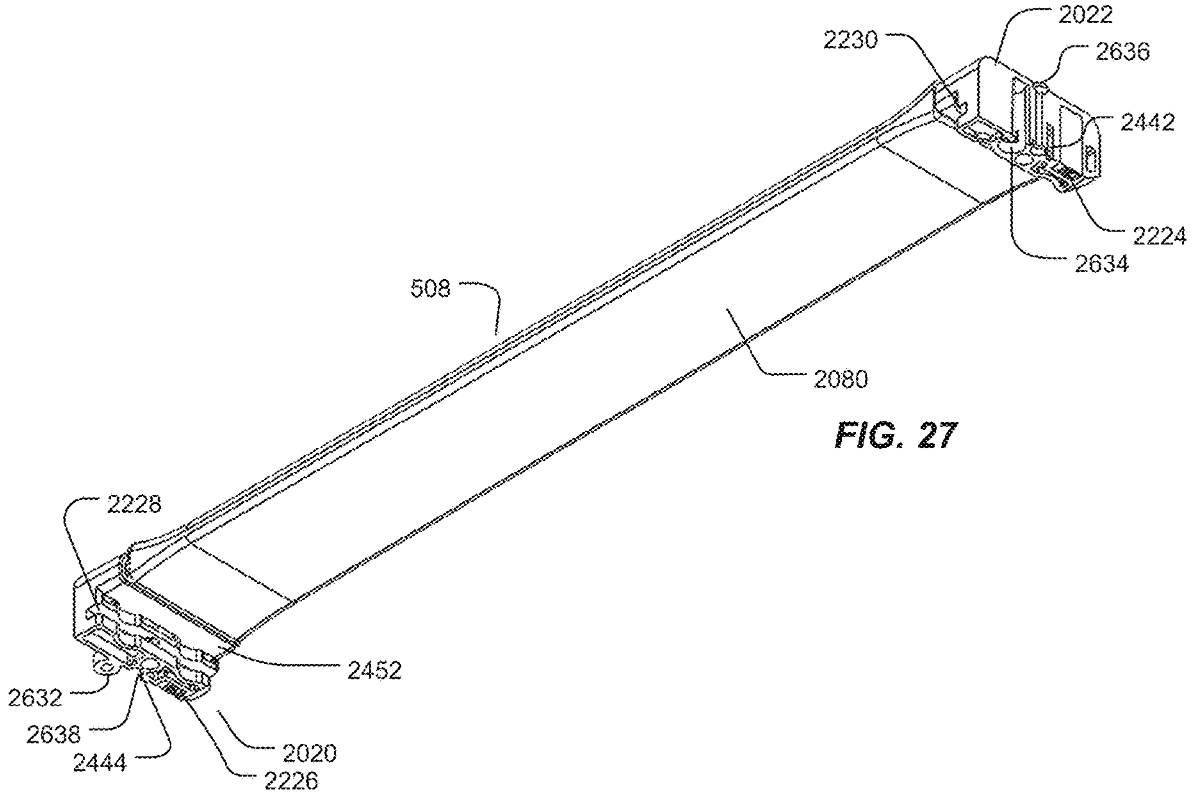
Figure 28:
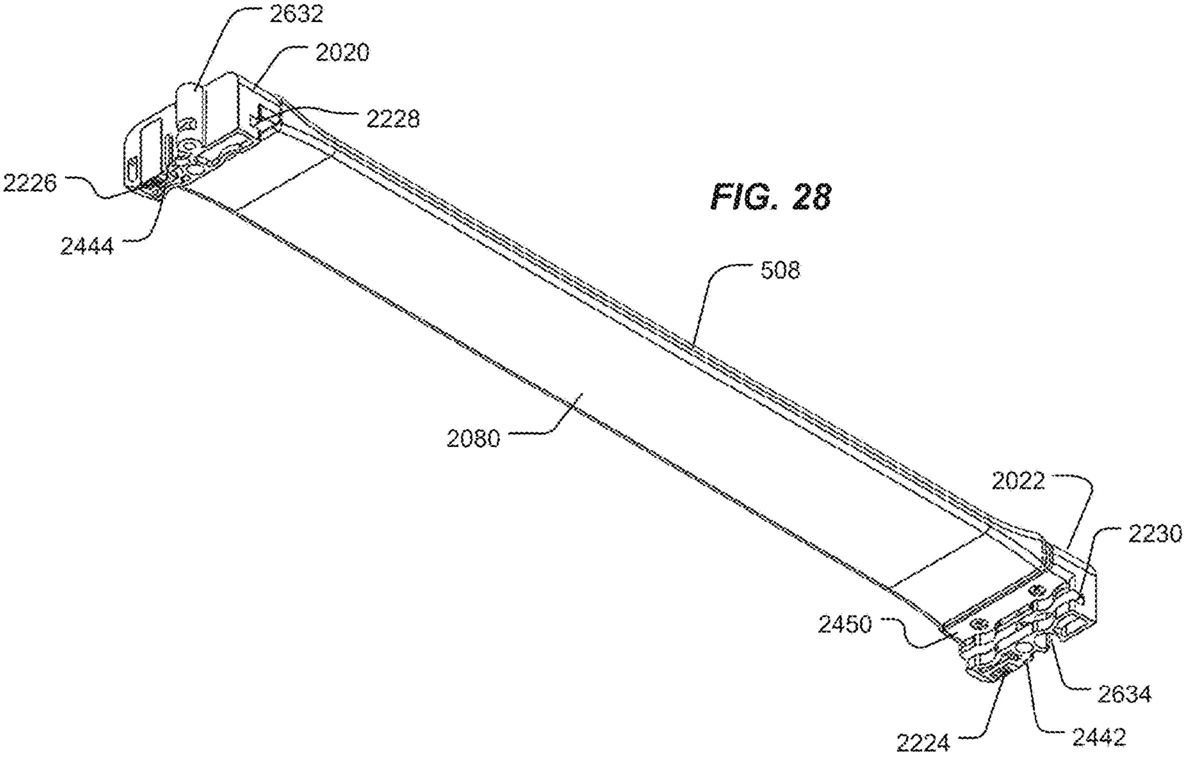
Figure 29:
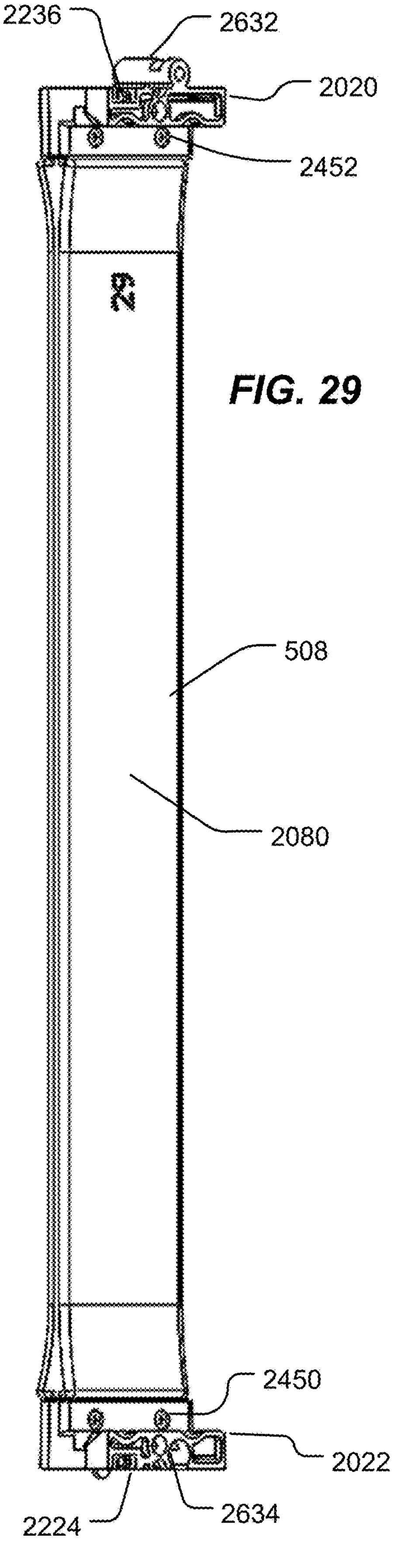
Figure 30:
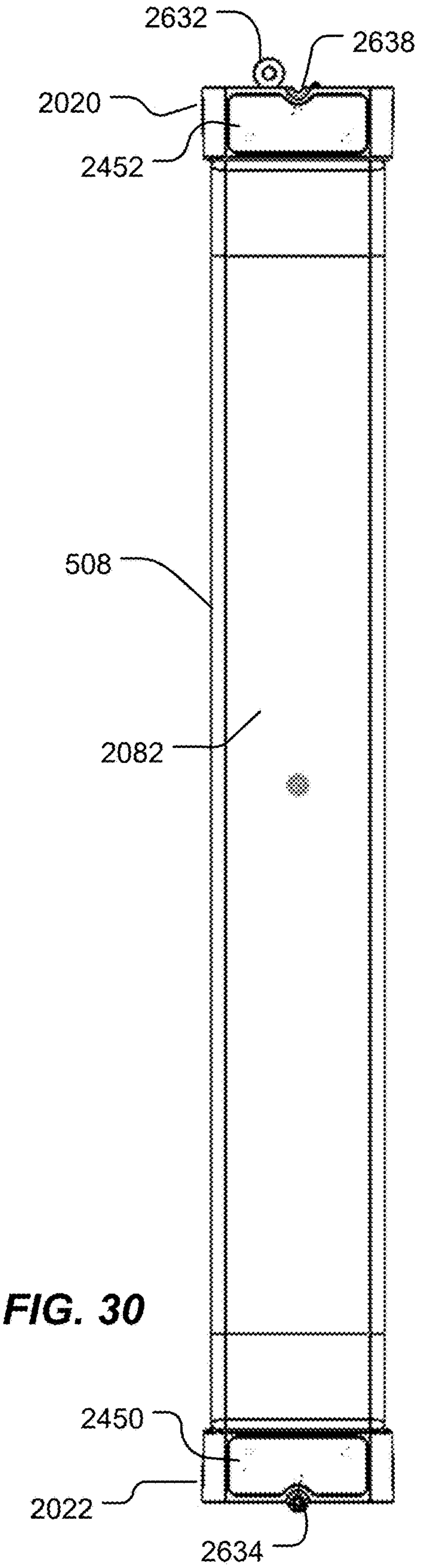
Figure 31:
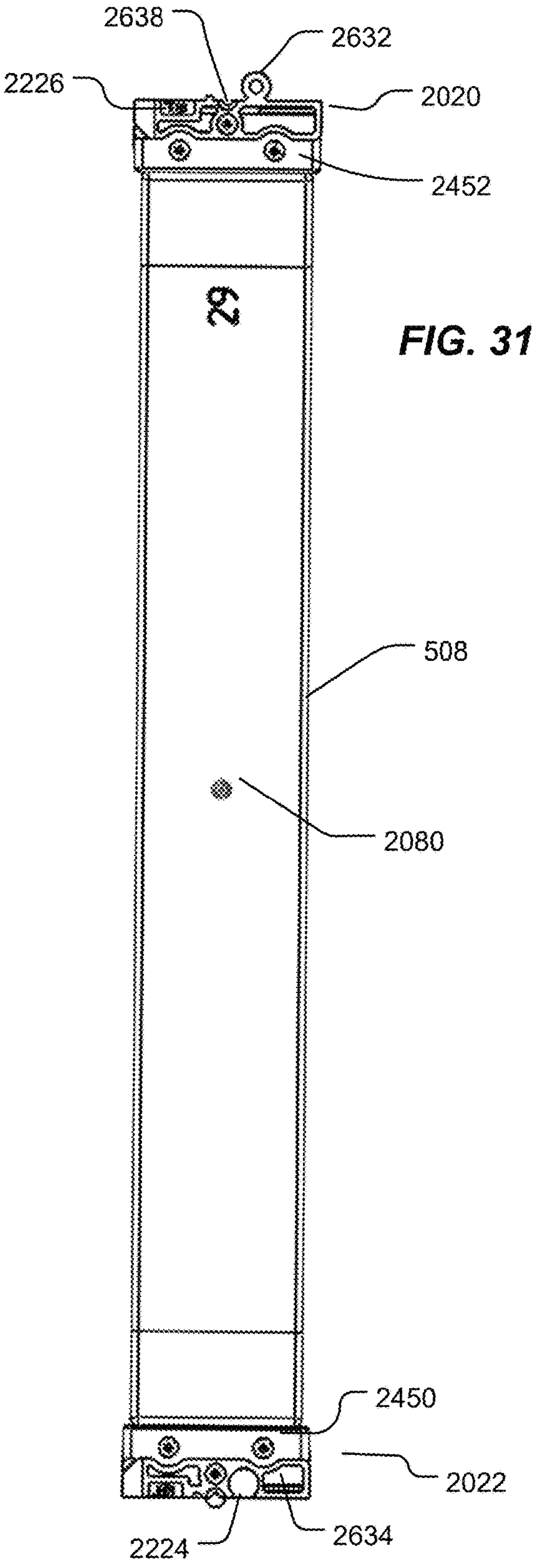
Figure 32:
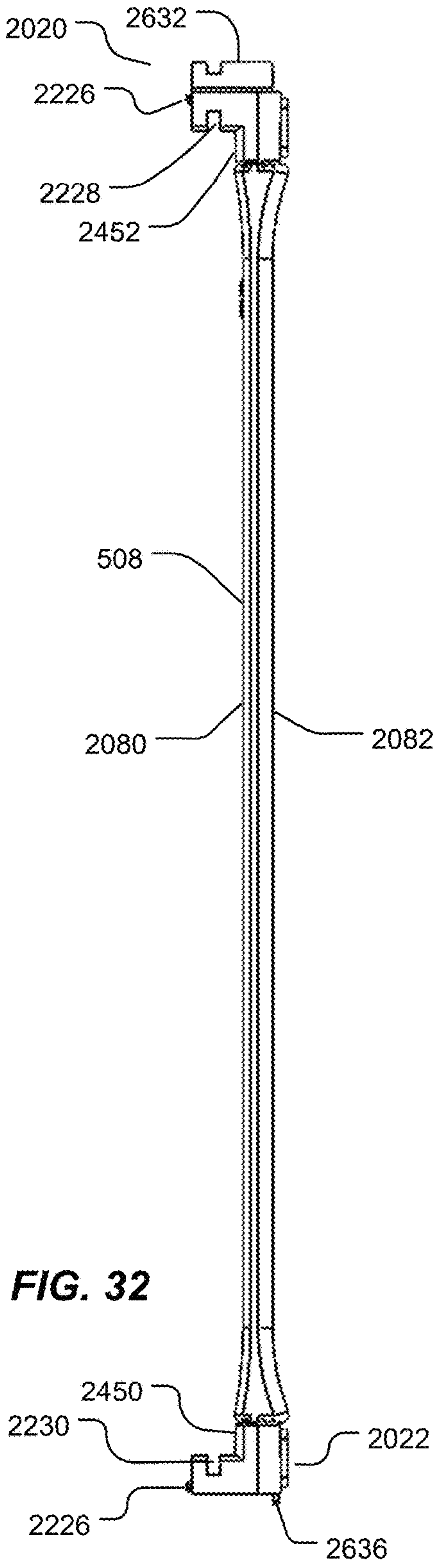
Figure 33:
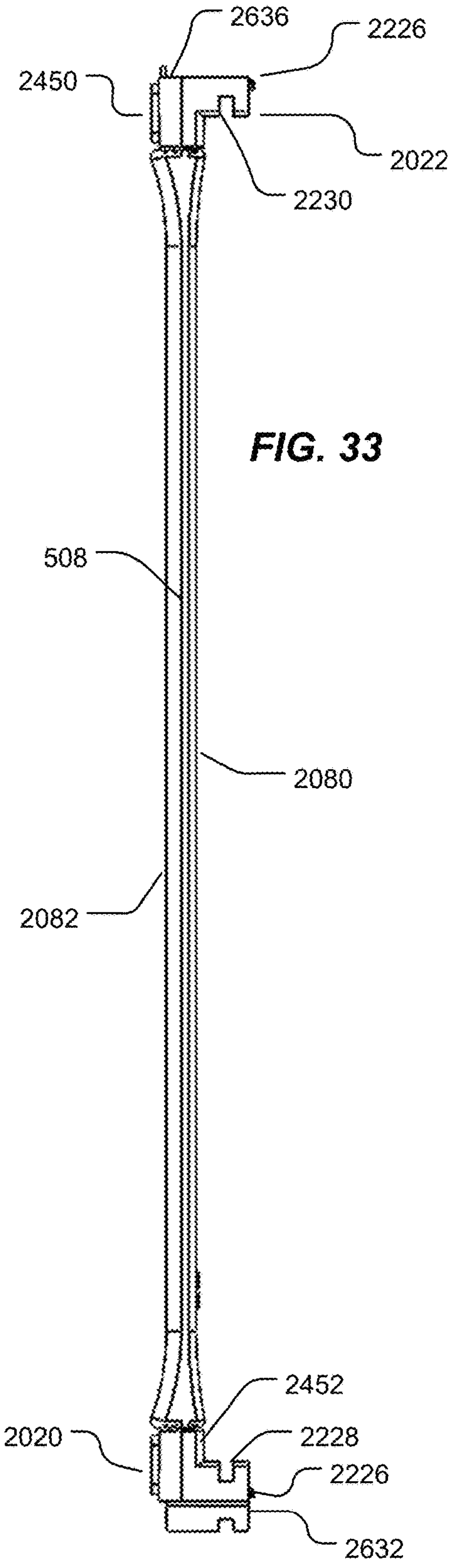

FIG. 26, FIG. 27, FIG. 28 illustrate perspective views of the bracelet 404 in an extended or flat configuration. As illustrated in FIG. 26, a strap 508 connects to an end component 2020 at a strap interface 2452 and connects to an end component 2022 and a strap interface 2450. As further illustrated in FIG. 27 and FIG. 28, the end components 2020 and 2022 extend outward from a surface 2080 that in the enclosed configuration forms the outward facing surface 2080. The end component 2020 forms a guide 2228 that extends parallel to the surface 2080. Similarly, the end component 2022 forms a guide 2230 that extends parallel to the surface 2080.

The end component 2020 includes the interjamb 2632 extending perpendicular to the surface 2080. The interjamb 2632 is disposed on an opposite side of the end component 2020 from the strap 508. In an example, the interjamb 2632 is a cylindrical component. The end component 2022 includes the blank 2634 that is configured to receive the interjamb 2632. In an example, the blank 2634 is a cylindrical opening configured to receive the interjamb 2632. The blank 2634 can be formed on an opposite side of the end component 2022 as the strap connector 2450.

Similarly, the end component 2020 can include a rail 2444 that extends perpendicular to the surface 2080 and is disposed on opposite side of the end component 2020 as the strap 508. The rail 2444 can have a square or rectangular cross-section. In another example, the rail 2444 can have a shape of a prism. The end component 2022 can include a guide 2442 configured to receive the rail 2444 of the end component 2020. The guide 2442 can be formed on an opposite side of the end component 2022 as the strap connector 2450.

The electrical connector 2226 of the end component 2020 and the electrical connector 2224 of the end component 2022 can be disposed on the end components distal from the respective strap connectors 2450 and 2452.

In an example, the strap connectors 2450 and 2452 can secure the strap 508 to the end components 2020 and 2022 using fasteners. The fasteners can include rivets, screws, nails, adhesive, or a combination thereof. In particular, the strap 508 is secure between the end component and a plate.

Figure 34:
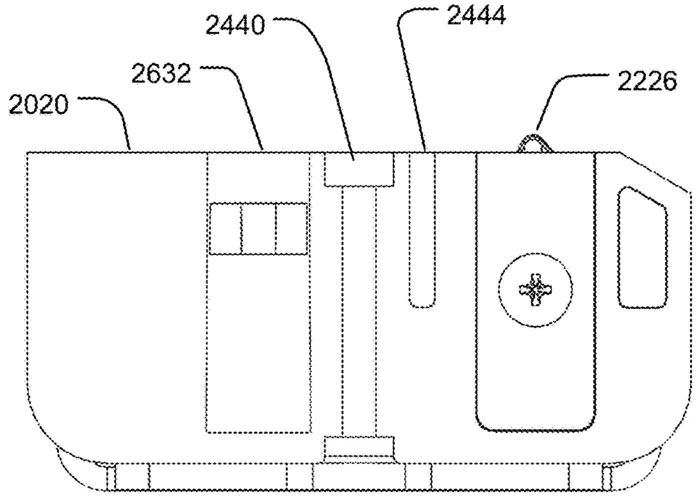

Turning to FIG. 34, an end of the end component 2020 when viewed towards the strap 508 includes the interjamb 2632 and optionally the rail 2444. The interjamb 2632 or the rail 2444 can extend partially along the height of the end of the end component 2020. Alternatively, the interjamb 2632 or the rail 2444 can extend the full height of the end of the end component 2020. A portion of the opening 2440 to receive a locking pin 1316 is formed at the end component 2020. The electrical connector 2226 extends out from the top of the end connector 2020.

Figure 35:
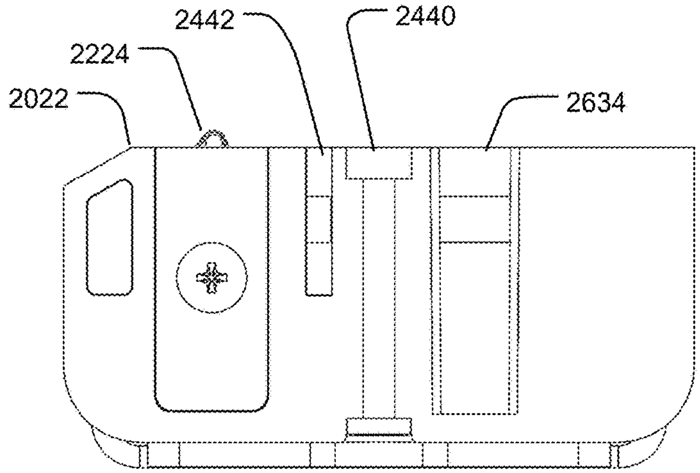

An end view of the end component 2022 when viewed towards the strap 508 includes the blank 2634 to receive the interjamb 2632 and optionally, the channel 2442 to receive the rail 2444, as illustrated in FIG. 35. The end component 2022 forms the other side of the opening 2440 to receive the locking pin 1316. The electrical connector 2224 extends out from a top of the end connector 2022.

Figure 37:
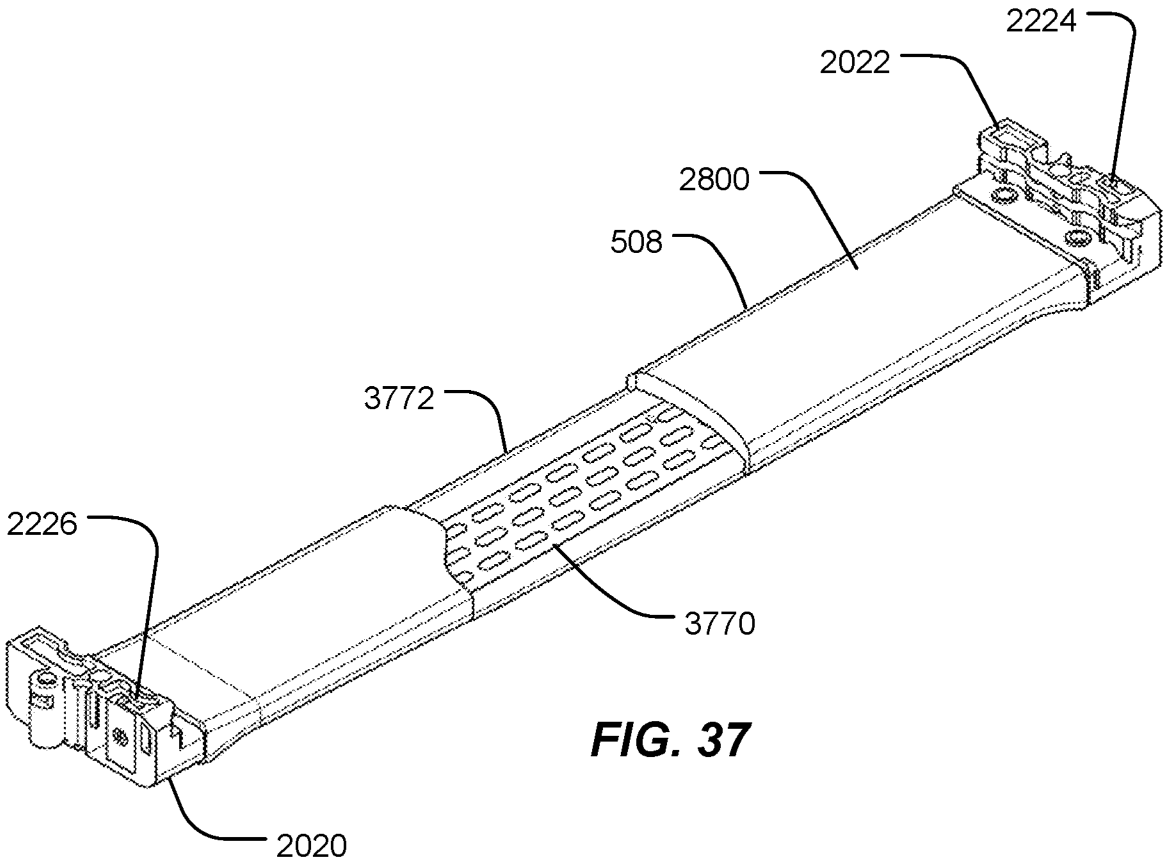
FIG. 37 includes an illustration of an example bracelet of a wearable monitor.

As illustrated in FIG. 37, the strap 508 includes a circuitry 3770, such as a tamper detection circuitry, embedded in a material 3772, such as a resilient or pliable material, of the strap 508. In an example, the material 3772 is overmolded on the circuitry 3770. In particular, the circuitry 3770 has a specified resistance. Any change in the resistance or breaking of the circuit indicates tampering with the strap or bracelet 404.

Figure 38:
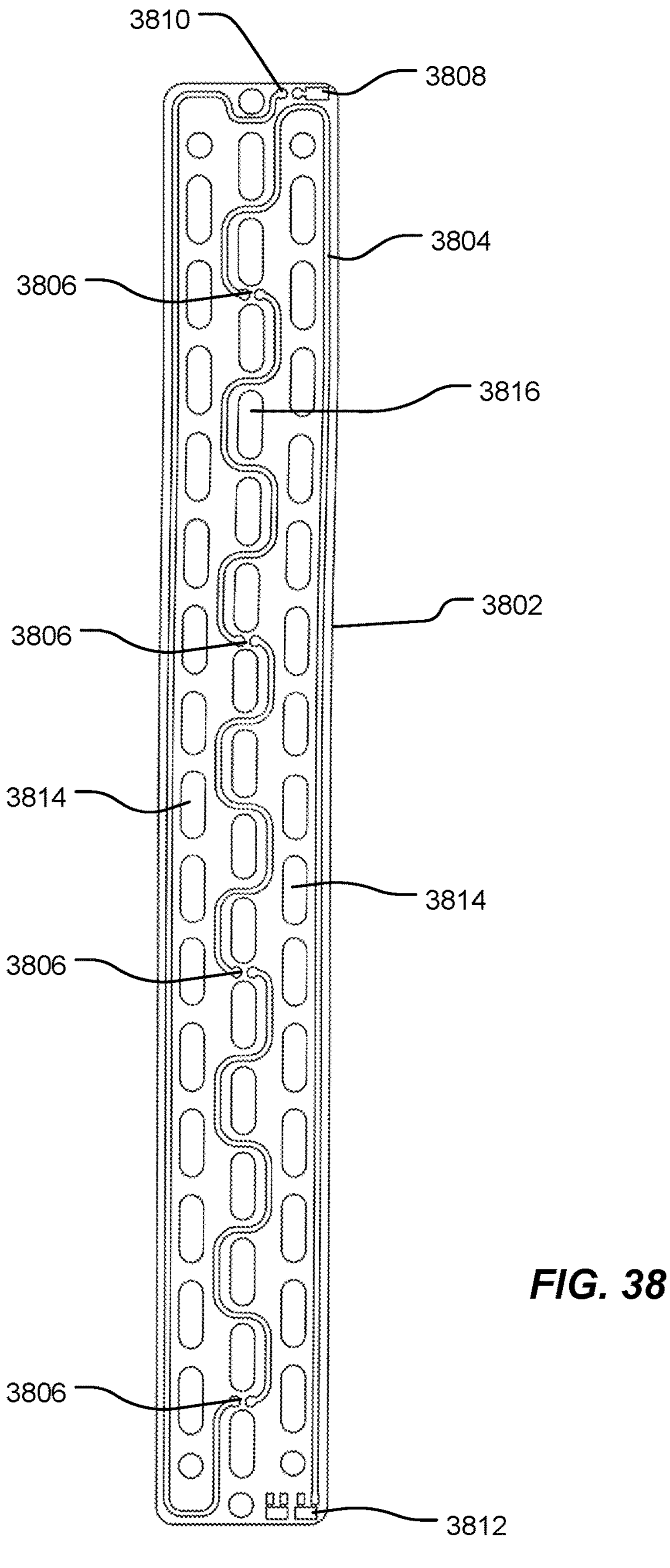
FIG. 38 includes an illustration of an example securities circuit for use within a strap.

The circuitry can have an expected resistance that when changed indicates tampering with the strap 404. For example, FIG. 38 illustrates an example circuit board 3802, such as a flexible circuit board, to be embedded within the bracelet 404. The flexible circuit board 3802 includes a conductive path 3804 defined along the flexible circuit board 3802. In an example, the conductive path 3804 is serpentine, passing back and forth and back again across the circuit board 3802. In various locations 3806 along the serpentine path, resistors can be disposed which assist with defining the resistance across the conductive path 3804. At pads 3808 and 3812, the conductive path 3804 can connect with pads or pins to interface with a base which detects the resistance along the conductive path 3804. Optionally, an additional resistor 3810 can be disposed in proximity to one or both of the terminal ends 3808 or 3802 of the conductive path 3804. In a further example, the flexible circuit board 3802 includes openings or 3814 or 3816 to enhance flexibility of the flexible circuit board and to improve adhesion of the overmolded strap to the flexible circuit board. One or more openings 3814 or 3816 can be defined within the flexible circuit board 3802.

Figure 36:
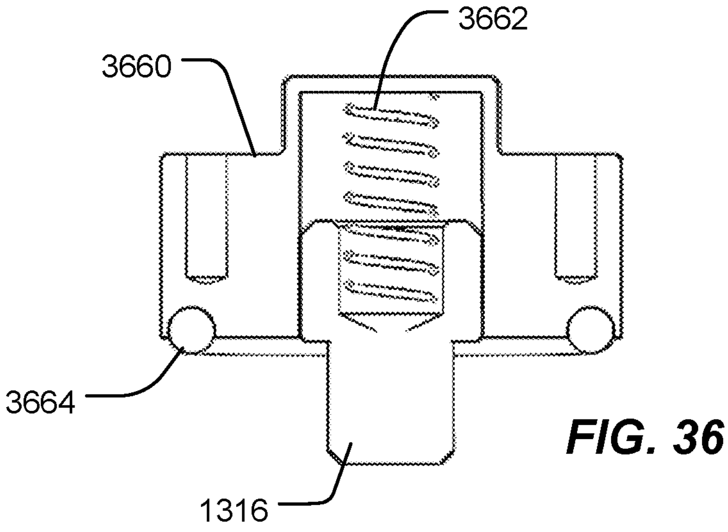
FIG. 36 includes an illustration of an example locking mechanism for use in a wearable monitor.

As illustrated in FIG. 36, the locking pin 1316 is incorporated into a locking mechanism that forms part of the base unit 402. The locking mechanism includes a housing 3660 that forms an opening from which the locking pin 1316 extends. A spring 3662 can be disposed within the opening. A resilient seal 3664 can be formed around the locking pin 1316. When in a locked position, the locking pin 1316 extends outward from the housing 3660, motivated by the spring 3662. When unlocked, the locking pin 1316 can be drawn into the housing 3660. For example, the locking pin 1316 can be drawn into housing using an electromagnet. In particular, the locking mechanism is designed to fail in a locked position with the pin 1316 extending out from housing 3660 and into the opening 2440 of the interface connector 510 of the bracelet 404.

Figure 39:
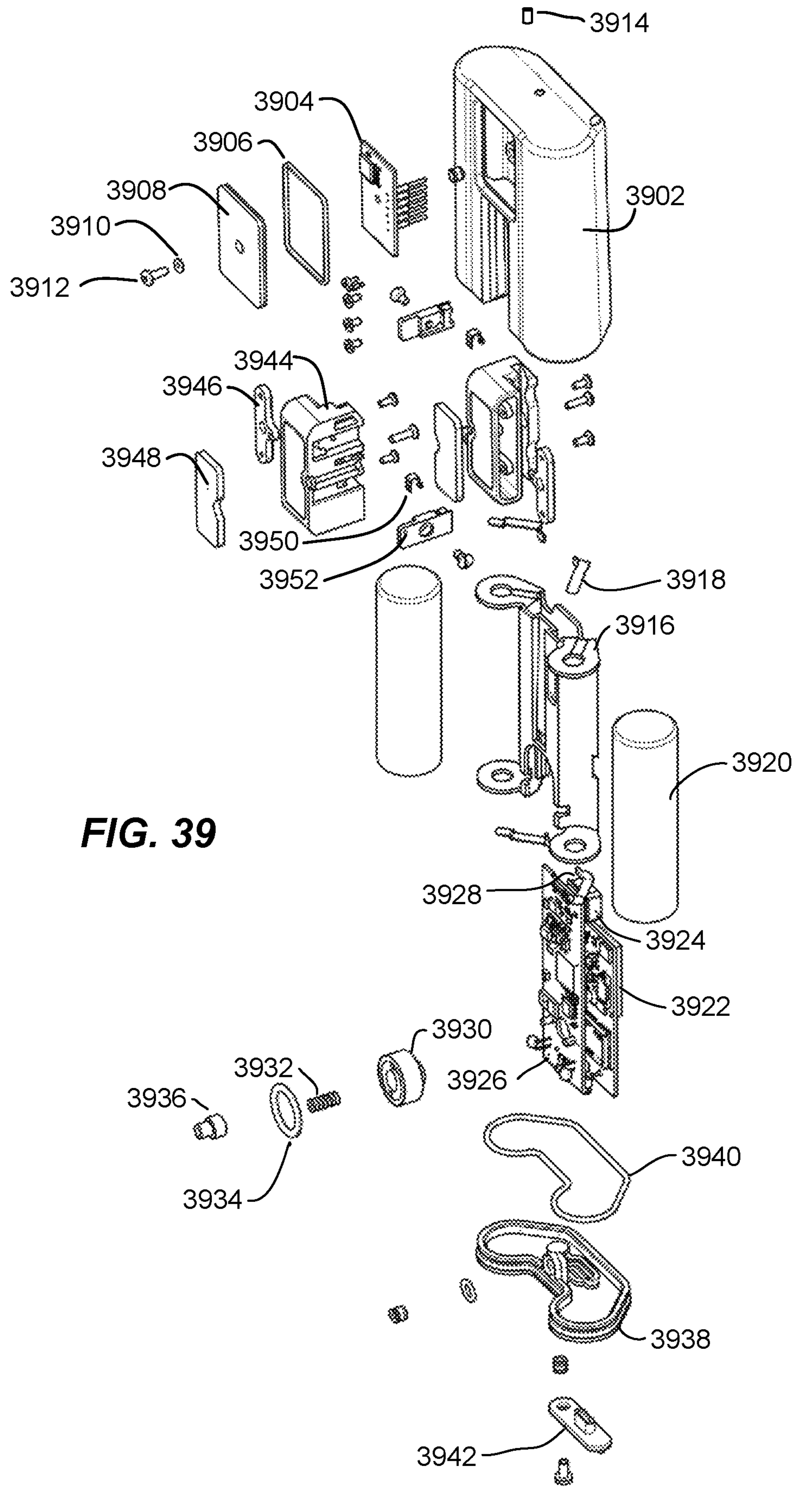
FIG. 39 includes an exploded view of an example base unit.

Turning to FIG. 39, an exploded view of the device is illustrated. The base unit, such as base unit 404 of FIG. 4, can include a housing 3902. In one portion of the housing 3902, an antenna circuit board 3904 can be sealed with a seal 3906 and a pocket cover 3908. The pocket cover 3908 can be secured with an O-ring seal 3910 and a screw 3912.

In another portion of the housing 3902, power storage devices, such as batteries 3920, can be secured to a holder 3916 and electrically connected to circuit boards using battery contacts 3918.

The base unit can further include circuit boards 3926 and 3922. In an example, the circuit boards can include additional antennas, such as a GPS antenna 3924, Bluetooth® circuitry, or Wi-Fi circuitry and can include contacts for interacting with the bracelet, such as contacts 3928. The circuit board can further include USB interface circuitry.

The basic unit can further include a locking mechanism 3930 that interacts with the locking pin 3936 to secure the end connectors of the bracelet. The locking pin 3936 can securely fit into the locking mechanism 3930 and be motivated by a spring 3932. A seal 3934 may further fit around the locking pin 3936.

The various components of the base unit can be secured in the housing 3902 with a seal 3940 and backplate 3938. A wired interface 3942 can extend through the back plate 3938 and be in communication with one or more of the circuit boards 3922 or 3926. For example, the interface 3942 can be a universal serial bus (USB) port, such as a USB-A, B, or C port, a Thunderbolt™ port, or a Firewire™ port. The interface 3942 can be in electronic communication with a circuit board (e.g., circuit boards 3926 or 3922) secured within the housing 3902. In addition, the user interfaces, such as lights or speakers, can be secured to the circuit board (e.g., circuit boards 3926 or 3922). For example, an LED light can be secured to the circuit board and can be used to indicate functionality or power status of the device. In another example, it can be used to indicate a boundary violation. In a further example, the wearable monitor can include a kinetic device to communicate through vibration. The base unit can further include a light guide 3914 to provide indicators to a user.

The end connectors of the bracelet can include a connector housing 3944. A plate 3946 can be used to secure strap to the connector housing 3944. A back pad 3948 can further be secured to the connector housing 3944 to provide comfort to a user. The end connector can further include electrical connector 3952 in communication with the circuitry of the strap. The electrical connection 3952 can be secured in the connector housing 3944 with an end plate 3952.

The wearable monitor, such as an ankle monitor or bracelet, can be used to track the location of an individual, such as an alleged offender, as an alternative to incarceration. The individual wearer may be assigned a region or area in which they are permitted to be, and as such, boundaries may be defined around that region such that crossing a boundary or being outside of that region represents a violation. In another example, boundaries or regions can be defined within which the individual is not allowed to be, such as in proximity to an individual or location subject to a restraining order. Such boundaries or regions can be stored within a tracking system, and upon receiving a wearer's location, can be compared to the location of the wearer to determine whether a violation is occurring. In another example, such boundaries or regions can be downloaded into the base unit 402 and the monitor can compare the present location of the monitor to the permitted regions or boundaries to determine whether a violation has occurred. If a violation has occurred, the unit can notify the wearer, encouraging them to return to their permitted region. Alternatively, or in addition, the wearable monitor can, in addition to providing location information, provide status alerts to the tracking system which can in turn contact the wearer, contact authorities, or contact victims.

Figure 40:
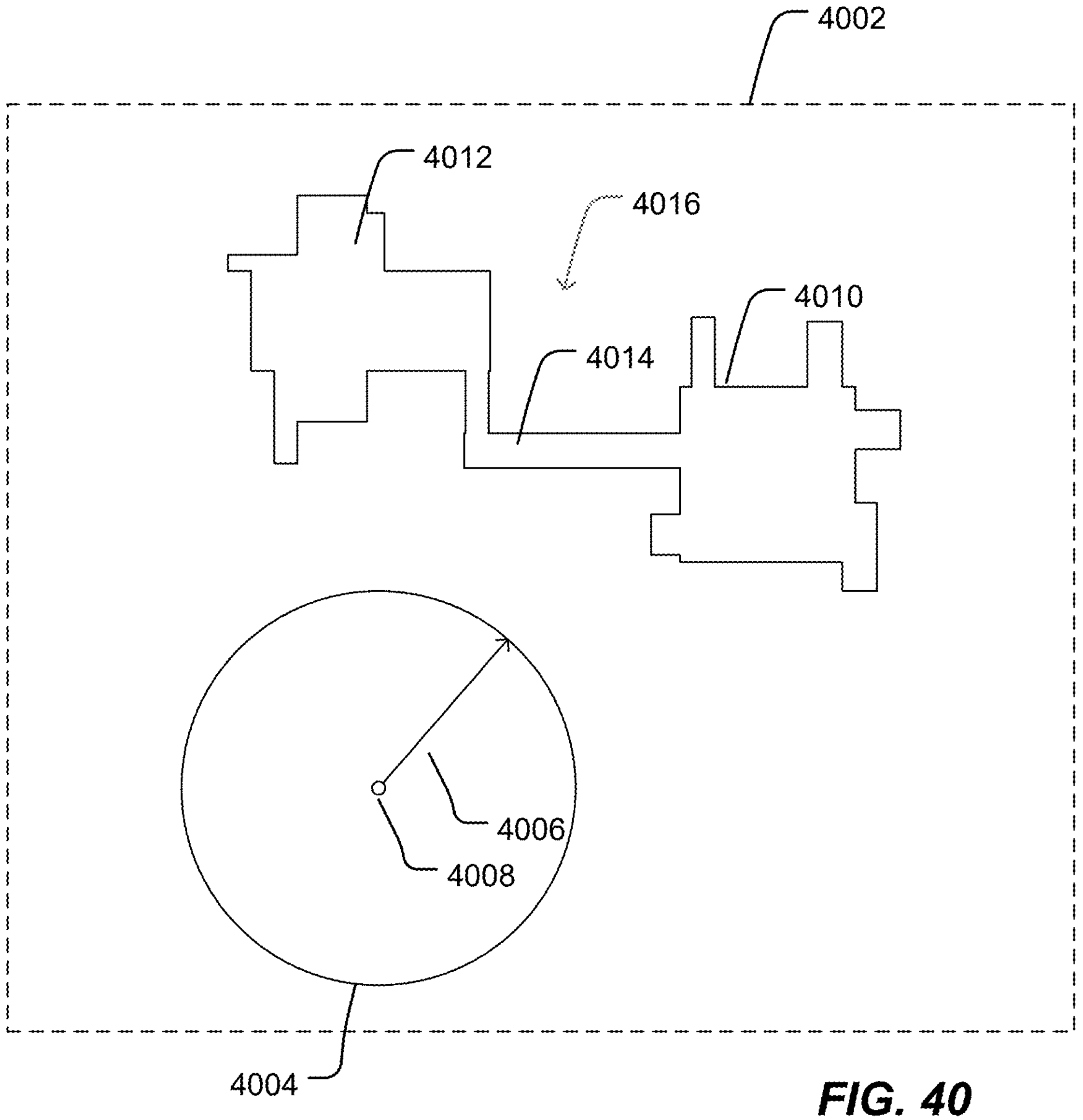
FIG. 40 includes an illustration of example boundaries for use in the tracking system.

In an example, FIG. 40 represents boundaries and permissible regions to be compared to a wearer's location. For example, over an area 4002, such as a city, regions such as region 4004 or 4016 can be defined. In an example, a region 4004 can be defined based on a radius 4006 from a center point 4008. The region 4004 may represent the permissible region in which the wearer is allowed to be. Alternatively, the region 4004 can represent a region outside of which the wearer is allowed to be or within which the wearer is not allowed to be. For example, a victim can have a restraining order providing boundaries around particular addresses. In another example, a region 4016 can be defined based on access to work, home, or groceries. For example, a region 4010 can be defined around an individual's home based on permissible city blocks on which the individual is allowed to be. A similar region 4012 can be provided around, for example, a workplace. In addition, a corridor or 4014 can be provided between the regions 4010 and 4012 as a permissible path to get between home and work, for example. Such regions tend to be rectilinear and are indicative of city blocks and locations of home, work, and permissible shopping locations. In an example, such regions can be downloaded into the wearable monitor. The wearable monitor can monitor location of the individual to determine whether the wearer is within their permissible region or is within a region within which they are not allowed to be. The wearable monitor can alert the wearer and send location and status information to a tracking system.

Figure 41:
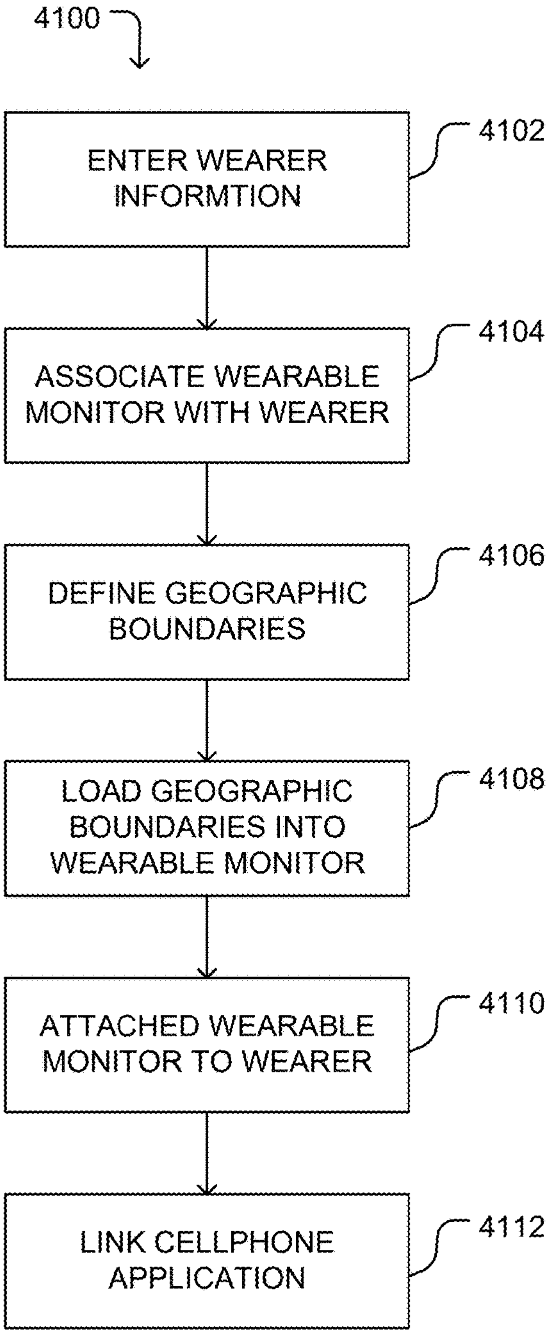
FIG. 41 includes a block flow diagram of a method for applying a wearable monitor.

To set up such a tracking system with the wearable monitor, an agent can collect information about the wearer, associate an ankle monitor with the wearer, and provide other initiating information to the ankle monitor before applying the ankle monitor to the wearer. For example, FIG. 41 illustrates a method 4100 for establishing tracking of a wearer. As illustrated at block 4102, the agent can enter wearer information into the tracking system. Wearer information can include a wearer's identity, payment information, address, information about court dates, legal representatives, and alternative contact information.

As illustrated at block 4104, the agent can associate a wearable monitor with the wearer. For example, the agent can associate the identity or network access information for the wearable monitor. For example, when a wearable monitor transmits information to the tracking system, it may provide an identifying code and optionally network address, which can be associated with the wearer.

The agent can further define boundaries, such as boundaries within which the wearer is required to stay or boundaries within which the wearer is not allowed to go. As such, the agent can define the geographic boundaries, as illustrated at block 4106. Such boundaries may be defined by the courts. For example, the court can define boundaries based on a restraining order or based on a jurisdiction. Further, geographical boundaries can be defined based on a radius from a particular location or based on other factors. Such geographical boundaries can be stored within the tracking system and compared to locations received from the wearable monitor. In another example, the geographical boundaries may be loaded into the wearable monitor, as illustrated at block 4108. For example, such boundaries can be loaded either wirelessly or through a wired connection into the base. In an example, the wired interface of an ankle monitor can be used to download boundary data to the wearable monitor.

Once the initial step is complete, the wearable monitor can be attached to the wearer, as illustrated at block 4110. For example, the strap can be wrapped around the wearer's leg and the detachable strap can be inserted into the base. The base can be directed to lock the strap in place using the locking mechanism. Such instructions to lock the locking mechanism can be conducted wirelessly or can be through the wired connection. To remove the wearable monitor, the locking mechanism can be directed to open, allowing the strap to release from the interface of the base.

Optionally, the wearer may have a cell phone that has a cell phone application providing a further means of notifying the wearer, providing the wearer with access to payment systems, and showing the wearer status of the wearable monitor. Optionally, other cell phone applications, such as a victim cell phone application can be provided with access through the tracking system of location data or specific alerts tied to the location data.

Figure 42:
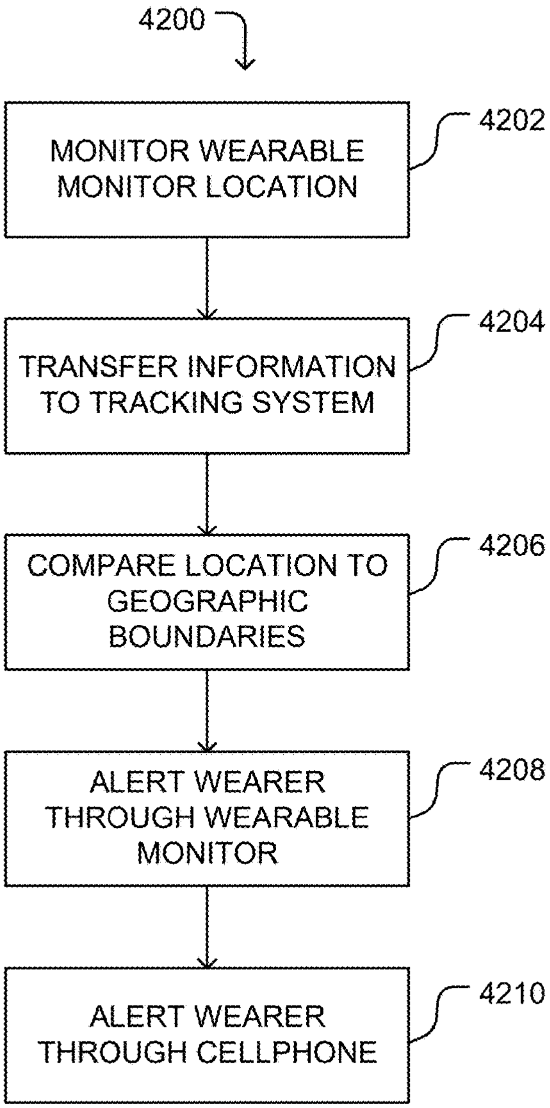
FIG. 42 and FIG. 43 include a block flow diagram illustrating example methods for monitoring a wearer.

Once attached, the wearable monitor can monitor the location of the wearer to determine whether violations of boundaries have occurred. For example, as illustrated in FIG. 42, a method 4200 for monitoring a wearable monitor includes monitoring the wearable monitor location, as illustrated at 4202. For example, the wearable monitor may monitor location based on GPS location, accelerometer data, or a combination thereof. In another example, the wearable monitor may monitor location based on triangulation of cell phone signals, Wi-Fi signals, or other wireless signals. In a further example, the wearable monitor can access information on the user's phone to identify location information.

As illustrated at block 4204, the wearable monitor can transfer information to the tracking system. For example, the wearable monitor can transfer the location information. Further, the wearable monitor can transfer status associated with the wearable monitor, such as a status of the security circuit extending through the strap, a power status of the device, operational status of the device, or software errors or component malfunctions, or other information associated with system status. Further, the wearable monitor can transfer alert statuses.

The wearable monitor, if provided with geographic boundaries, can compare the locations to the geographic boundaries, as illustrated at block 4206. For example, the wearable monitor may determine whether the wearer is beyond a fixed distance from a set location or was within a geographic boundary defined by or on the tracking system.

When a wearable monitor is not within the boundaries or has violated one of the boundaries, an alert can be provided to the wearer through the wearable monitor, as illustrated at block 4208. For example, the wearable monitor may provide a sound indicating the violation of a boundary. In another example, the wearable monitor may provide a light indication for visual indication of a violation. Further, the wearable monitor may through a local connection, such as Wi-Fi or Bluetooth®, notify the cell phone application of the wearer to alert the wearer through the cell phone, as illustrated at block 4210. In another example, the wearable monitor provides an alert status to the tracking system. The tracking system then provides an alert to the wearer's cell phone.

Figure 43:
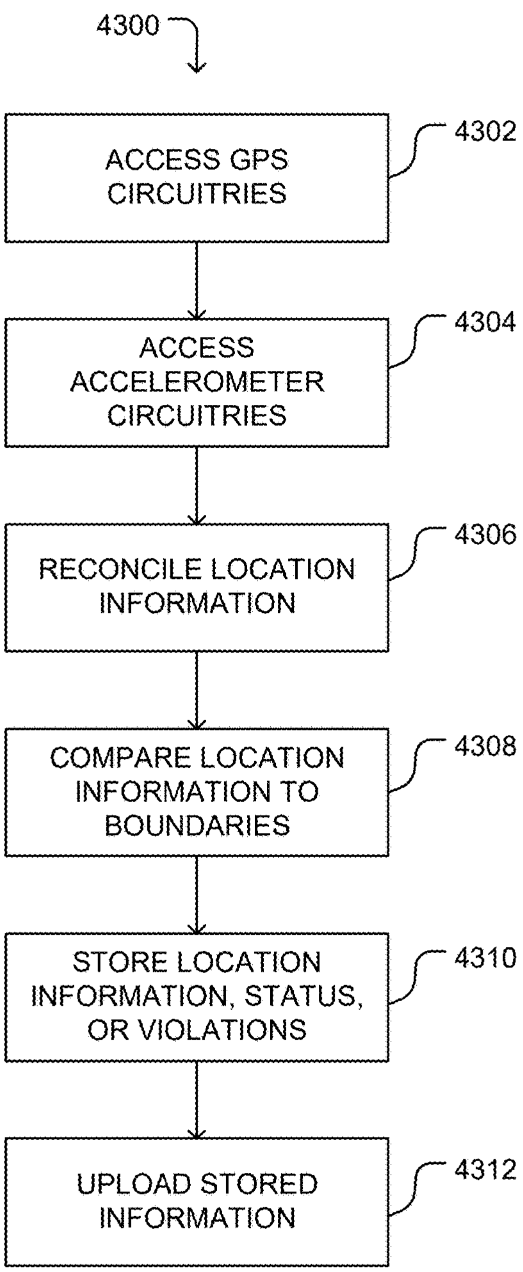

At times, a wearer may pass under a bridge or into a building through which GPS information or access is limited. In such an example, the additional circuitry within the wearable monitor may reconcile location using other methods. For example, as illustrated in FIG. 43, a method for communicating location information includes accessing GPS circuitry, as illustrated in block 4302. The wearable monitor may be in a location at which GPS signals are available. The circuitry can access the signals to determine location.

In addition, accelerometers may be used to further determine position, as illustrated at block 4304. For example, accelerometers can determine location based on movements of the wearable monitor.

Using the combined methods of the GPS circuitry and the accelerometer circuitry, the location can be reconciled, as illustrated in block 4306. For example, GPS location may be lost, and the accelerometer data relied upon to more accurately indicate a location of the person based on last known position using GPS and movements of the wearable monitor following loss of the GPS signal.

Once the location is determined, the location can be compared to geographical boundaries, as illustrated at block 4308. Such boundaries may indicate regions in which the wearer is required to stay or locations the wearer is not allowed to be. The system can determine an alert status based on a comparison of location information and the geographical boundaries. In an example, the alert status can be determined by the wearable monitor. In another example, the alert status can be determined by the tracking server. In a further example, the alert status can be determined by the wearer's smartphone.

As illustrated at block 4310, such information, statuses, or violations can be stored within a memory of the wearable monitor. If a signal is lost to communicate with the tracking servers, the wearable monitor can store location information and status until such time as a network communication is reestablished.

As illustrated in block 4312, stored information can be uploaded when the network is available. For example, the location, history, status, and or violations can be provided to the tracking servers and used to perform various functions at by the tracking servers. For example, the stored information can be uploaded directly to the tracking server when a cellular data network is available. In another example, the stored information can be uploaded to the smartphone and then transmitted to the tracking server.

Figure 44:
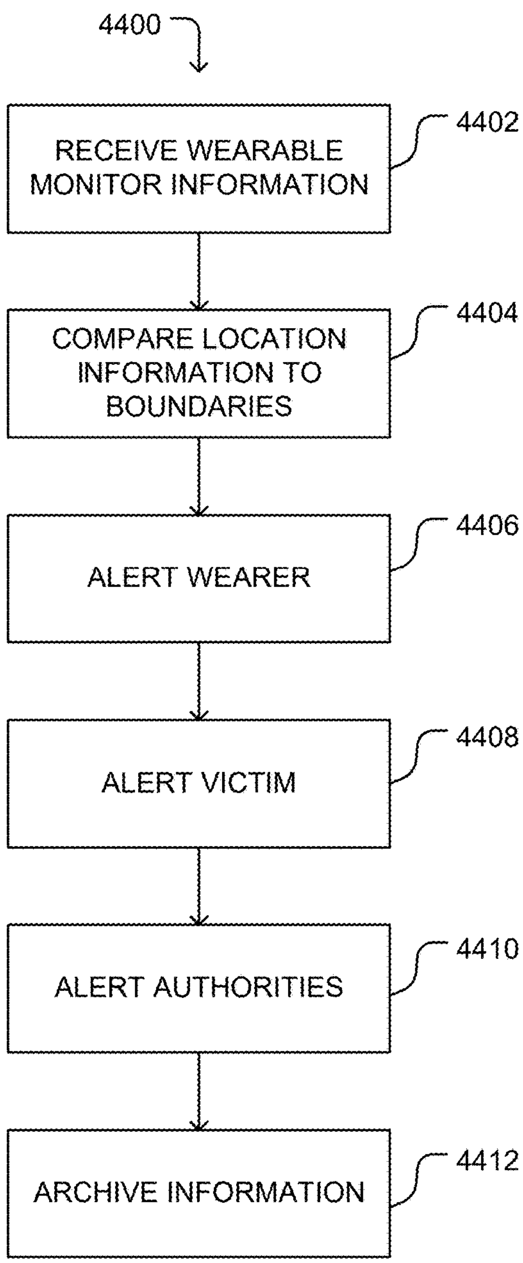
FIG. 44 includes a block flow diagram illustrating a method for providing alerts based upon location information of the wearable monitor.

In an example, the tracking servers may determine status associated with the device and statuses associated with violation boundary violations. As illustrated in FIG. 44, a method 4400 includes receiving the wearable monitor information from the wearable monitor at the tracking server, as illustrated at block 4402. Such information can include device status, location information, or alerts.

The tracking servers can compare the location information to the geographic boundaries associated with the wearer, as illustrated at block 4404. Violations of such boundaries can result in various alerts, such as alerts to the wearer warning of the violation, alerts to victims of a wearer's proximity to the victim, and alerts to authorities should it become necessary to arrest or detain the individual. For example, an alert can be sent to the wearer's tracking device or the wearer's cell phone, for example, through the app, text, or email, as illustrated at block 4406. In an example, the wearable monitor can be directed to provide an auditory or visual alert to the wearer through the wearable monitor. In another example, alerts can be sent to a cell phone application associated with the wearer to provide alerts to wearer through a cell phone that a violation has occurred and encouraging compliance boundaries.

Alerts can be sent to victims, as illustrated at block 4408. For example, the alert can be sent to a cell phone application associated with a victim's cell phone to notify them of a violation by the wearer of the wearable monitor.

If the wearer has not complied with the geographical boundaries, alerts can be sent to authorities, as illustrated block 4410. Such alerts can be forwarded to court systems to utilize location history or alert history in determining compliance with court orders. In another example, alerts can be sent to policing authorities encouraging the detainment of the individual.

Further, the tracking servers can archive the information, as illustrated at block 4412. For example, the information can be stored in databases. In particular example, the information can be stored in an immutable block chain storage system.

In an example, the tracking system can be implemented using a tracking server, an electronic ankle monitor, and a smartphone. The tracking server can communicate with the ankle monitor and the smartphone using a cellular data network. For example, the tracking server can be connected to a global data network, such as the Internet, which is connected to various cellular data networks.

In an example, the tracking server implements a web application through which an agent can initiate and monitor the electronic ankle monitor. In addition, the agent can initiate the smartphone application and associate the smartphone and the application with the ankle monitor or the individual to which the electronic ankle monitor is applied.

Initiating the electronic ankle monitor can include activating a locking mechanism, creating a profile associating an individual wearer of the electronic ankle monitor, and establishing payment methods for equipment rental and tracking services. Through the web application, the agent can also disconnect or unlock the electronic ankle monitor, address issues with the ankle monitor, and review status and location of the electronic ankle monitor.

Initiating the smartphone application on the smartphone can include installing the application on the smartphone, associating the phone number of the smartphone with the individual and ankle monitor worn by the individual, or setting up payment methods, among other activities.

The web application can further implement interfaces for authorities, such as parole officers, law enforcement, or the court system. In another example, the web application can include victim information that allows alerts to be sent to a victim. For example, the system can include a second smartphone application coupled with a smartphone associated with a victim. When the wearer of the ankle monitor violates a geographical boundary, such as that of a restraining order, the tracking server can notify the victim through the victim smartphone application. In a further example, the web application can communicate with a smartphone application on smartphones associated with law enforcement or other officers of the court. In such an example, the tracking server can provide information such as location, ankle monitor status, and boundary violations to parole officers, law enforcement officers, or other agents of the court.

In an exemplary embodiment, the web application on the tracking server can provide an interface to one or more agents. The dashboard can provide notifications of issues associated with the ankle monitors, track active devices, and track users of the smartphone application. In some cases, alleged offenders can be tracked using the cell phone or smartphone application without the use of an ankle monitor.

The dashboard can further provide information regarding upcoming events for each of the wearers of the ankle monitor bracelets or active users of the smartphone application. For example, users of the smartphone application and optionally wearers of the ankle monitor are required to check-in periodically using the smartphone application. The user check-in can be required randomly or can be required in association with court dates or other events associated with the wearer's legal restrictions.

In a further example of an interface implemented by the web application on the tracking server, the agent can be shown issues associated with the ankle monitor devices applied to various individuals. For example, the issues can include problems with the device functionality, charge status, tampering status, or payment issues.

The web application can further provide a listing of active devices including information about the alleged offender to which the device has been attached. Such an interface can provide additional data such as batteries status, phone number associated with the individual to which the device is attached, and other identifying information associated with the individual.

An interface can be provided to the agent that identifies which individuals also have or separately have a smartphone application implementing tracking. The interface can include information about the user, the phone number, associated email address, or additional contact information, as well as status of the application.

The agent can further drill down to look at information about a specific user who may be a user of the smartphone application, the electronic ankle monitor, or both. The interface can provide specific information about events associated with that user, as well as tracking information associated with the electronic ankle monitor, the smartphone application, or a combination thereof. The interface can further require that any unlocking of a device be confirmed by the agent and provide the agent additional alerts specific to the individual, such as the status of the charge, in which mode the device is in, and if the offender violated a geographical boundary.

The web application implemented on the tracking server can permit the establishment of zones. In an example, the zones can be based on the radius from a set location or can be rectilinear associating regions of the city. The boundaries may indicate regions where the wearer is allowed to be or regions where the wearer is not allowed to be. For example, the wearer may be provided with a region in which they are allowed to be at home or at work. In another example, there may be established sets of geographic boundaries where the wearer is not allowed to be. The agent can be provided with options of applying a new address and a radius around that address where the person is allowed or drawing on a map where the person is allowed. Similarly, the interface provides the ability to add addresses or regions on a map to which the individual is restricted.

In an example, zones or regions can be uploaded to the electronic ankle monitor. The electronic ankle monitor using its location circuitry can determine whether the wearer is violating a boundary. For example, if a cellular data access or a GPS connection is lost, the electronic ankle monitor can continue to monitor location based on accelerometers and compare the estimated location with the boundaries provided through the web application on the tracking server. The web application can further allow the agent to track the location of the electronic ankle monitor on a map. Optionally, the agent can track both the location of the ankle monitor and the location of the smartphone implementing the smartphone application associated with the wearer of the electronic ankle monitor. In such an example, if the user or individual is required to perform electronic check-in using the smartphone application, the agent can compare the location of the smartphone used to perform the check-in with the location of the ankle monitor.

The locations can be shown on a map. The location can further be shown in a table, along with various other information about the device.

The web application implemented on the tracking server can further notify the agent of violations of the set of geographical boundaries. For example, violations can be illustrated on a map showing the set of geographical boundaries and the location of the electronic ankle monitor. Depending on the nature of the violation, the agent can report the issue to an authority, contact the individual wearing the electronic ankle monitor, or send alerts to the smart phone application or the electronic medical monitor.

Wearers of the electronic ankle monitor can have a smartphone with a smartphone application. The smartphone application can be utilized to require check-in either randomly or in association with certain events, update account information such as making payments, and reporting issues with the device.

An exemplary dashboard can be displayed on a smart phone application. The dashboard can be associated with someone being tracked either using the smartphone application or using an electronic ankle monitor. The dashboard can, for example, indicate a balance due for the individual, as well as upcoming events such as periodic check-ins and court dates.

The individual can make payments towards an account, such as bail account, rental of the electronic ankle monitor, or payment for monitoring services.

In a particular example, the smartphone application can be used to require an individual to check-in. Checking-in can include selecting a button to indicate a check-in, which provides location information of the smartphone application or smartphone or the electronic ankle monitor. An individual can take a picture of themselves to confirm that they are at the same location as the smartphone or the electronic ankle monitor. Optionally, electronic facial recognition can be used to confirm that the individual is present in the same location as the smartphone or the ankle monitor. The system can then require periodic mobile check-ins in which the individual takes a picture and confirms their identity and that they are located in proximity to the smartphone or the electronic ankle monitor.

The individual may also be required to confirm that they are aware of certain events and check-in at those events. For example, the individual can be provided with an interface in which they indicate that they are aware of an upcoming court date. In another example, the individual can confirm that they are at a location; for example, they are in court. Optionally, the person may be required to take a photo to further confirm that they are, in fact, located in the same location as the smartphone or the ankle monitor bracelet.

The smartphone application can further provide the world with the ability to report issues with the device itself or with comfort. For example, an interface can be provided that allows the individual to indicate whether they have issues with the battery, issues with the functionality of the device, or other issues.

The smartphone application can further provide notifications to the user such as a listing of various activities including scheduling payments, checking-in, acknowledging court dates, and boundary violations.

Figure 45:
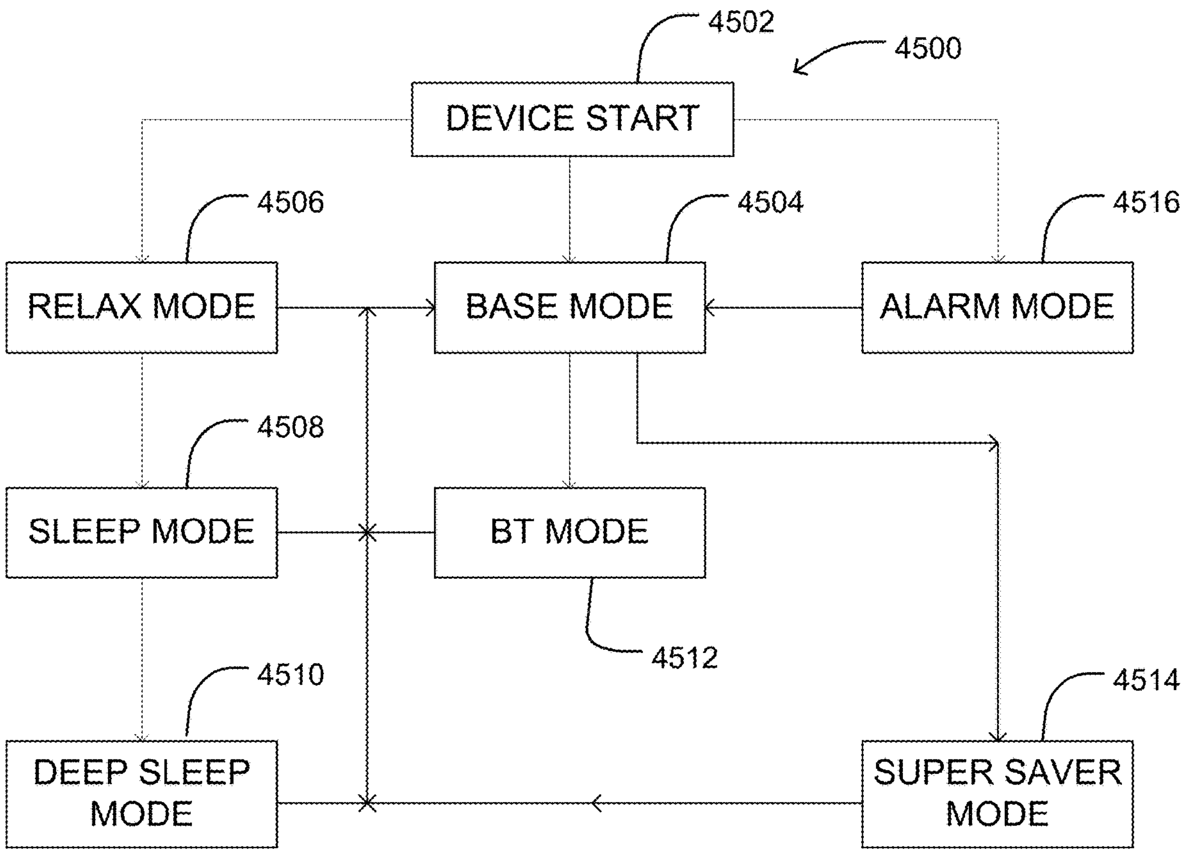
FIG. 45 includes a block flow diagram illustrating a method for transitioning between operating modes of a wearable monitor.

Turning to FIG. 45, a method 4500 for operation of the personal tracking device is illustrated. At block 4502, the device starts and begins communicating with a server. For example, the device can communicate with a server through a cellular network or through a Wi-Fi network. Optionally, during setup, the device can communicate through a wired connection, such as a USB port, to the server or a computational device.

The device enters a base mode, as illustrated at block 4504. In the base mode, the device can communicate GPS location of the personal tracking device, power level, tamper status, and other information through a cellular network or optionally, a Wi-Fi network and can record positioning in its internal memory, such as on an SD card. In an example, the personal tracking device may track location and intervals in a range of 1 to 10 seconds, such as an interval of 6 seconds. For example, the personal tracking device can use global positioning (GPS) to track location. In addition or alternatively, the personal tracking device may further include accelerometers or other position sensors. Testing of the tamper detection circuitry can be activated at intervals in a range of 0.1 to 10 seconds, such as 0.2 seconds. The internal memory of the personal tracking device can record position at intervals in a range of 5 seconds to 20 seconds, such as an interval of 12 seconds. The device can remain in a base mode while there is movement of the device, for example, of greater than 10 m, within a set period of time or until a command is received from the server.

In an example, if the personal tracking device does not move within a set period of time, such as moving less than 10 m during an interval of 15 minutes, the device can enter into a relaxed mode, as illustrated at block 4506. In the relaxed mode, the frequency of communication using a cellular network or a Wi-Fi network is reduced. Optionally, the interval between recorded positions in the internal memory is reduced. In relaxed mode, for example, the interval of communication can be reduced or changed to an interval in a range of 10 to 15 minutes.

In a further example, if the personal tracking device does not move within an additional period of time, the device may enter into a sleep mode, as illustrated at block 4508. For example, when in relaxed mode, if the device does not move more than 10 m in an additional 15 minute interval, the device may enter into sleep mode. In sleep mode, the frequency of communication using a cellular network or Wi-Fi network is further reduced. For example, the interval of communication can be changed to 30 minutes. In sleep mode, the interval of detecting GPS position can be increased, for example to every one minute. Optionally, position can be recorded on the internal memory at an increased interval, such as every two minutes.

When in sleep mode, if the position of the device does not change over an extended period, for example not greater than 10 m over an additional 30 minute interval, the device can enter deep sleep mode, as illustrated at block 4510. In a deep sleep mode, the interval for communicating can be further increased, as well as the interval for detecting GPS location and recording position on the internal memory. For example, the interval for communicating can be increased to every 30 minutes, 45 minutes, or an hour. The GPS can be detected once every 30 minutes, 45 minutes, or an hour. Further, the position can be recorded at intervals in a range of 30 minutes to an hour, such as every hour.

Whether in the relax, sleep, or deep sleep mode, when the position of the device changes significantly, such as by greater than 10 m, within a set period of time, the device can return to base mode, as illustrated at 4504.

Optionally, the device can interact with a mobile app on a smart phone or other Bluetooth® enabled device. When a smart phone or other Bluetooth® enabled device is connected to a cellular network or a Wi-Fi network, the device can enter into BT mode, as illustrated at block 4512. In BT mode, the device can turn off or deactivate its cellular network connection or Wi-Fi connection. Further, the device can interact with the smart phone or Bluetooth® enabled device to gather GPS information from the smart phone or Bluetooth® enabled device and may turn off the internal GPS antenna. The device can continue recording position at increased intervals. For example, device can record position at intervals of 30 seconds. If the device loses connection with the mobile app or if the smart phone or Bluetooth® enabled device loses connection with the server, such as losing cellular or Wi-Fi connection, the device can return to base mode, as entered illustrated at block 4504.

In a further example, the device can enter super saver mode, as illustrated at block 4514, based on charge levels or a command from the server. For example, the device can enter super saver mode based on a low level of power, such as when the device has less than 10% charge. In an example, the interval for sending data to the server is increased and energy consuming interface components such as LEDs are disabled. For example, the device may send data to the server every hour and retrieve GPS coordinates every hour. When the charge of the device increases, such as increasing to greater than 10% or increasing to greater than 30%, the device can return to base mode, as illustrated at block 4504.

As illustrated at block 4516, the device can enter into alarm mode. For example, the device may enter into alarm mode if the circuit connection with the strap is lost. In another example, the device can enter into alarm mode based on a command from the server, such as if the position of the device is in a restricted area or the device is outside of its permitted area. In alarm mode, communication with the server can occur more frequently such as every 30 seconds. Optionally, position can be recorded more frequently such as every six seconds. In an example, the system can return to base mode, as illustrated at block 4504, in response to a command from the server, for example, a command to deactivate the alarm or a command that indicates that the device is within an allowed zone.

In a first embodiment, an ankle monitoring device includes a base that houses computational circuitry; communication circuitry in communication with the computational circuitry, the communication circuitry including a cellular data network circuitry; location circuitry in communication with computational circuitry, the location circuitry including global positioning system (GPS) circuitry and one or more accelerometers; and a detection circuitry in communication with the computational circuitry. The ankle monitoring device further includes a strap to engage the base and in electrical communication with the detection circuitry.

In an example of the first embodiment, the strap includes embedded circuit with a set resistance, the detection circuitry to detect tampering based on a change in resistance from the set resistance.

In another example of the first embodiment and the above examples, to engage the base, the strap includes a locking pin. For example, the ankle monitor device further includes a locking mechanism including a motor to turn a lock nut to engage the locking pin. In another example, the locking pin is in communication with the embedded circuitry of the strap and when engaged with the lock nut is secured against a pogo pin of the detection circuitry. In an additional example, the ankle monitor device further includes a second locking pin. For example, the ankle monitor device further includes a fixed locking screw to secure the second locking pin to the base. In an example, the second locking pin is secured against a pogo pin of the detection circuitry when secured with the fixed locking screw.

In a further example of the first embodiment and the above examples, the ankle monitor device further includes auditory circuitry in communication with the computation circuitry to provide audible alerts to a wearer of the ankle monitor.

In an additional example of the first embodiment and the above examples, the ankle monitor device further includes visual circuitry in communication with the computation circuitry to provide visual alerts to a wearer of the ankle monitor.

In another example of the first embodiment and the above examples, the ankle monitor device further comprises a wired electronic interface. For example, the ankle monitor device further includes a detachable interface to engage and communicate with the wired electronic interface. In an example, the detachable interface and the wired electronic interface are secured together using a magnet. In another example, the detachable interface includes a USB port, a Thunderbolt™ port, or a Firewire™ port.

In a further example of the first embodiment and the above examples, the communication circuitry further includes Bluetooth circuitry.

In an additional example of the first embodiment and the above examples, the ankle monitor device further includes a kinetic circuitry to provide alerts using vibration.

In a second embodiment, a tracking system includes a tracking server in communication with a network in communication with a cellular data network and an electronic ankle monitor. The electronic ankle monitor includes a base that houses computational circuitry; communication circuitry in communication with the computational circuitry, the communication circuitry in communication with the tracking server through the cellular data network; location circuitry in communication with computational circuitry, the location circuitry including global positioning system (GPS) circuitry and one or more accelerometers; and a detection circuitry in communication with the computational circuitry; and includes a strap to engage the base and in electrical communication with the detection circuitry. The tracking server is in communication with a smartphone application implemented on a smartphone via the cellular data network, the smartphone application associated with a wearer of the electronic ankle monitor.

In an example of the second embodiment, the tracking server is in communication with a second smartphone application implemented on a second smartphone via the cellular data network.

In another example of the second embodiment and the above examples, the second smartphone is associated with a victim.

In a further example of the second embodiment and the above examples, the second smartphone is associated with law enforcement.

In an additional example of the second embodiment and the above examples, the strap includes embedded circuit with a set resistance, the detection circuitry to detect tampering based on a change in resistance from the set resistance.

In another example of the second embodiment and the above examples, to engage the base, the strap includes a locking pin. For example, the tracking system further includes a locking mechanism including a motor to turn a lock nut to engage the locking pin. In an example, the locking pin is in communication with the embedded circuitry of the strap and when engaged with the lock nut is secured against a pogo pin of the detection circuitry. In another example, the locking mechanism is activated based on a signal from the tracking server. In a further example, the tracking system further includes a second locking pin. For example, the tracking system further includes a fixed locking screw to secure the second locking pin to the base. In an example, the second locking pin is secured against a pogo pin of the tamper circuitry when secured with the fixed locking screw.

In a further example of the second embodiment and the above examples, the tracking system further includes auditory circuitry in communication with the computation circuitry to provide audible alerts to a wearer of the ankle monitor.

In an additional example of the second embodiment and the above examples, the tracking system further includes visual circuitry in communication with the computation circuitry to provide visual alerts to a wearer of the ankle monitor.

In another example of the second embodiment and the above examples, the tracking system further includes a wired electronic interface. For example, the tracking system further includes a detachable interface to engage and communicate with the wired electronic interface. In an example, the detachable interface and the wired electronic interface are secured together using a magnet. For example, the detachable interface includes a USB port, a Thunderbolt™ port, or a Firewire™ port.

In a further example of the second embodiment and the above examples, the communication circuitry further includes Bluetooth circuitry.

In a third embodiment, a method of tracking an individual using an electronic ankle monitor includes determining a location with a location circuitry using a combination of global positioning system signals and accelerometer signals; comparing, using an ankle monitor computational circuitry, the location to a set of geographical boundaries stored on the ankle monitor; and alerting the individual of a violation of a boundary based at least in part on the comparing.

In an example of the third embodiment, the method further includes communicating the location to a tracking server via a cellular data network.

In another example of the third embodiment and the above examples, the method further includes storing the location on the electronic ankle monitor.

In a further example of the third embodiment and the above examples, the method further includes receiving the set of geographical boundaries from a tracking server.

In an additional example of the third embodiment and the above examples, the method further includes associating a smartphone with the electronic ankle monitor using a smartphone application implemented on the smartphone.

In another example of the third embodiment and the above examples, alerting the individual includes sending a signal to the smartphone and providing an alert via the smartphone application.

In a further example of the third embodiment and the above examples, alerting the individual includes providing an auditory alert using the electronic ankle monitor.

In an additional example of the third embodiment and the above examples, alerting the individual includes providing a visual alert using the electronic ankle monitor.

In another example of the third embodiment and the above examples, alerting the individual includes providing a kinetic alert using the electronic ankle monitor.

In a further example of the third embodiment and the above examples, the method further includes providing a user check-in interface with a smartphone application associated with the individual. For example, the user check-in interface utilized facial recognition.

In an additional example, the method further includes sending a locking signal to the electronic ankle monitor, a locking mechanism securing a strap to a base of the electronic ankle monitor. For example, the method further includes communicating a lock status from the electronic ankle monitor to a tracking server.

In a fourth embodiment, a method for tracking an individual includes establishing communication between smartphone application and tracking server; communicate a location of the smartphone to the tracking server; and randomly requiring the individual to perform a check-in utilizing facial recognition through the smartphone application.

In an example of the fourth embodiment, the method further includes requiring the individual to perform a check-in through the smartphone application for a court appearance.

In another example of the fourth embodiment and the above examples, the method further includes associating the individual with an ankle monitor and associating the ankle monitor with the smartphone application. For example, the method further includes providing data from the ankle monitor to the smartphone application. In another example, the method further includes providing boundary violation alerts through the smartphone application based on the data provided from the ankle monitor.

In a fifth embodiment, a personal tracking device includes circuitry that includes a processor, memory, location circuitry, wireless and/or wired communication circuitry, power supply, user interface; a housing that incorporates the circuitry; and a strap with an integrated locking mechanism that couples to the housing.

In a sixth embodiment, a method to make a personal tracking device includes providing circuitry that includes a processor, memory, location circuitry, wireless and/or wired communication circuitry, power supply, user interface; providing a housing that incorporates the circuitry; and providing a strap with an integrated locking mechanism that couples to the housing.

In a seventh embodiment, a method to use a personal tracking device includes using circuitry that includes a processor, memory, location circuitry, wireless and/or wired communication circuitry, power supply, user interface; providing a housing that incorporates the circuitry; and providing a strap with an integrated locking mechanism that couples to the housing.

In an eighth embodiment, a non-transitory program storage device readable by a computing device that tangibly embodies a program of instructions executable by the computing device to perform a method to use a personal tracking device including using circuitry that includes a processor, memory, location circuitry, wireless and/or wired communication circuitry, power supply, user interface; providing a housing that incorporates the circuitry; and providing a strap with an integrated locking mechanism that couples to the housing.

In a ninth embodiment, a personal tracking device includes means for using circuitry for a personal tracking device; providing a housing that incorporates the circuitry means; and providing a strap with an integrated locking mechanism that couples to the housing.

In a tenth embodiment, a system for a personal tracking device includes a personal tracking device in communication with one or more tracking servers; where the personal tracking device can determine its location and status and communicate both to the tracking servers; where the personal tracking device includes circuitry that includes a processor, memory, location circuitry, wireless and/or wired communication circuitry, power supply, user interface; a housing that incorporates the circuitry; and a strap with an integrated locking mechanism that couples to the housing.

In an eleventh embodiment, a method to make a system for a personal tracking device includes providing a personal tracking device in communication with one or more tracking servers; where the personal tracking device can determine its location and status and communicate both to the tracking servers; where the personal tracking device includes circuitry that includes a processor, memory, location circuitry, wireless and/or wired communication circuitry, power supply, user interface; a housing that incorporates the circuitry; and a strap with an integrated locking mechanism that couples to the housing.

In an twelfth embodiment, a method to use a system for a personal tracking device includes using a personal tracking device in communication with one or more tracking servers; where the personal tracking device can determine its location and status and communicate both to the tracking servers; where the personal tracking device includes circuitry that includes a processor, memory, location circuitry, wireless and/or wired communication circuitry, power supply, user interface; a housing that incorporates the circuitry; and a strap with an integrated locking mechanism that couples to the housing.

In a thirteenth embodiment, a non-transitory program storage device readable by a computing device that tangibly embodies a program of instructions executable by the computing device to perform a method to use a system for a personal tracking device including using a personal tracking device in communication with one or more tracking servers; where the personal tracking device can determine its location and status and communicate both to the tracking servers; where the personal tracking device includes circuitry that includes a processor, memory, location circuitry, wireless and/or wired communication circuitry, power supply, user interface; a housing that incorporates the circuitry; and a strap with an integrated locking mechanism that couples to the housing.

In a fourteenth embodiment, a system for a personal tracking device includes a personal tracking device in communication with one or more tracking servers; where the personal tracking device can determine its location and status and communicate both to the tracking servers; where the personal tracking device includes means for using circuitry for a personal tracking device; a housing that incorporates the circuitry; and a strap with an integrated locking mechanism that couples to the housing.

In a fifteenth embodiment, a personal tracking device includes a base unit including a housing defining a connector interface, the connector interface including a set of rails; and a bracelet including: a strap; a first connector attached at a first end of the strap, the first connector including a first guide on a side of the first connector connected to the strap and including an interjamb disposed on an opposite side of the first connected from the strap; a second end connector attached at a second end of the strap, the second connector including a second guide on a side of the second connector connected to the strap and including a blank on an opposite side of the second connector and configured to receive the interjamb; when the interjamb is inserted into the blank, the first and second connectors join to form an interface connector including the first and second guides on opposite sides of the interface connector, the first and second guides configured to engage the set of rails of the connector interface.

In an example of the fifteenth embodiment, the base unit further includes a locking mechanism including a locking pin exposed in the connector interface, the interface connector defining an opening to receive the locking pin. For example, the first connector defines a first portion of the opening, and the second connector defines a second portion of the opening.

In another example of the fifteenth embodiment and the above examples, the personal tracking device further comprises a computational circuitry disposed in the housing.

In a further example of the fifteenth embodiment and the above examples, the strap includes a tamper circuitry in electrical communication with a first electrical contact on the first connector and a second electrical contact on the second connector, the connector interface further including a contact pad, the base unit further comprising a detection circuitry in communication with the computational circuitry and the contact pads.

In an additional example of the fifteenth embodiment and the above examples, the base unit further includes communication circuitry in communication with the computational circuitry, the communication circuitry including a cellular data network circuitry. For example, the communication circuitry further includes wi-fi circuitry. In another example, the communication circuitry further includes Bluetooth® circuitry.

In another example of the fifteenth embodiment and the above examples, the personal tracking device includes a location circuitry in communication with computational circuitry, the location circuitry including global positioning system (GPS) circuitry and one or more accelerometers.

In a further example of the fifteenth embodiment and the above examples, the personal tracking device further includes a wired communication interface in communication with the computational circuitry. In an example, the wired communication interface is a USB port, a Thunderbolt™ port, or a Firewire™ port.

In an additional example of the fifteenth embodiment and the above examples, the personal tracking device further includes a kinetic circuitry to provide alerts using vibration.

In another example of the fifteenth embodiment and the above examples, the personal tracking device further includes an auditory circuitry in communication with the computation circuitry to provide audible alerts to a wearer of the ankle monitor.

In a further example of the fifteenth embodiment and the above examples, the personal tracking device further includes visual circuitry in communication with the computation circuitry to provide visual alerts to a wearer of the ankle monitor.

In a sixteenth embodiment, a method for attaching a personal tracking device includes wrapping a bracelet around an appendage of a wearer, the bracelet including a strap, a first connector at a first end of the strap, and a second connector at a second end of the strap, the first connector including a first guide on a side of the first connector connected to the strap and an interjamb disposed opposite the strap, the second connector including a second guide on a side of the second connector connected to the strap and a blank to receive the interjamb disposed opposite the strap; inserting the interjamb into the blank, joining the first and second connectors to form an interface connector having the first guide on a first side of the interface connector and the second guide on the second side of the interface connector; and attaching the interface connector to an interface of a base unit, the interface of the base unit including first and second rails, the first and second guides configured to receive the first and second rails.

In a seventeenth embodiment, a method for monitoring a wearer of a personal tracking device including a bracelet attached to a base unit includes operating in a base mode including: testing a tamper circuitry of a bracelet of the personal tracking device; determining a location of the personal tracking device with a location circuitry of the base unit; communicating the result of the testing and the location using a communication circuitry of the base unit using a cellular network; connecting with a cellular phone using the communication circuitry of the base unit, the cellular phone having a location circuitry to determine location and connected to a wireless network; and switching to a BT mode including based on the connecting with the cellular phone: turning off the location circuitry of the base unit; testing the tamper circuitry of the bracelet of the personal tracking device; receiving the location from the cellular phone; and communicating the result of the testing and the location received from the cellular phone through the network connection of the cellular phone.

In an example of the seventeenth embodiment, the method further includes disconnecting from the cellular phone and returning to the base mode.

In an eighteenth embodiment, a method for monitoring a wearer of a personal tracking device including a bracelet attached to a base unit includes operating in a base mode including: testing a tamper circuitry of a bracelet of the personal tracking device; determining a location of the personal tracking device with a location circuitry of the base unit; communicating the result of the testing and the location using a communication circuitry of the base unit at a first interval; when the location does not change in a specified time, switching to a relax mode including: communicating the result of the testing and the location at a second interval longer than the first interval; and when the location changes, switching to the base mode.

In an example of the eighteenth embodiment, the method further includes, in the relax mode, increasing an interval of recording the location in memory.

In another example of the eighteenth embodiment and the above examples, the method further includes switching to sleep mode when the location does not significantly change within an additional specified time, the sleep mode including: communicating the result of the testing and the location at a third interval longer than the second interval. For example, the method further includes, in the sleep mode, increasing an interval of determining the location of the personal tracking device. In a further example, the method further includes, in the sleep mode, increasing an interval of recording the location in memory.

In an additional example of the eighteenth embodiment and the above examples, the method further includes switching to deep sleep mode when the location does not significantly change within a further specified time, the deep sleep mode including: communicating the result of the testing and the location at a fourth interval longer than the third interval.

In another example of the eighteenth embodiment and the above examples, the method further includes, in the deep sleep mode, increasing an interval of determining the location of the personal tracking device.

In an additional example of the eighteenth embodiment and the above examples, the method further includes, in the deep sleep mode, increasing an interval of recording the location in memory.

While the present disclosure has been described in this disclosure regarding certain illustrated and described embodiments, those of ordinary skill in the art will recognize and appreciate that the present disclosure is not so limited. Rather, many additions, deletions, and modifications to the illustrated and described embodiments may be made without departing from the true scope of the invention, its spirit, or its essential characteristics as claimed along with their legal equivalents. In addition, features from one embodiment may be combined with features of another embodiment while still being encompassed within the scope of the invention as contemplated by the inventor. The described embodiments are to be considered only as illustrative and not restrictive. All changes which come within the meaning and range of equivalency of the claims are to be embraced within their scope. Disclosing the present invention is exemplary only, with the true scope of the present invention being determined by the included claims.

Note that not all of the activities described above in the general description or the examples are required, that a portion of a specific activity may not be required, and that one or more further activities may be performed in addition to those described. Still further, the order in which activities are listed is not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms “comprises,” “comprising,” “includes,” “including,” “has,” “having” or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, “or” refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of “a” or “an” are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A personal tracking device comprising:

a base unit including a housing defining a connector interface, the connector interface including a set of rails; and a bracelet including:

a strap a first connector attached at a first end of the strap, the first connector including a first guide on a side of the first connector connected to the strap and including an interjamb disposed on an opposite side of the first connected from the strap;

a second end connector attached at a second end of the strap, the second connector including a second guide on a side of the second connector connected to the strap and including a blank on an opposite side of the second connector and configured to receive the interjamb;

when the interjamb is inserted into the blank, the first and second connectors join to form an interface connector including the first and second guides on opposite sides of the interface connector, the first and second guides configured to engage the set of rails of the connector interface.

2. The personal tracking device of claim 1, wherein the base unit further includes a locking mechanism including a locking pin exposed in the connector interface, the interface connector defining an opening to receive the locking pin.

3. The personal tracking device of claim 2, wherein the first connector defines a first portion of the opening, and the second connector defines a second portion of the opening.

4. The personal tracking device of claim 1, further comprising a computational circuitry disposed in the housing.

5. The personal tracking device of claim 4, wherein the strap includes a tamper circuitry in electrical communication with a first electrical contact on the first connector and a second electrical contact on the second connector, the connector interface further including contact pads, the base unit further comprising a detection circuitry in communication with the computational circuitry and the contact pads.

6. The personal tracking device of claim 1, wherein the base unit further includes communication circuitry in communication with the computational circuitry, the communication circuitry including a cellular data network circuitry.

7. The personal tracking device of claim 6, wherein the communication circuitry further includes wi-fi circuitry.

8. The personal tracking device of claim 6, wherein the communication circuitry further includes Bluetooth® circuitry.

9. The personal tracking device of claim 1, further comprising a location circuitry in communication with computational circuitry, the location circuitry including global positioning system (GPS) circuitry and one or more accelerometers.

10. The personal tracking device of claim 1, further including a wired communication interface in communication with the computational circuitry.

11. The personal tracking device of claim 10, wherein the wired communication interface is a USB port, a Thunderbolt™ port, or a Firewire™ port.

12. The personal tracking device of claim 1, further comprising a kinetic circuitry to provide alerts using vibration.

13. The personal tracking device of claim 1, further comprising auditory circuitry in communication with the computation circuitry to provide audible alerts to a wearer of the ankle monitor.

14. The personal tracking device of claim 1, further comprising visual circuitry in communication with the computation circuitry to provide visual alerts to a wearer of the ankle monitor.

15. A method for attaching a personal tracking device, the method comprising:

wrapping a bracelet around an appendage of a wearer, the bracelet including a strap, a first connector at a first end of the strap, and a second connector at a second end of the strap, the first connector including a first guide on a side of the first connector connected to the strap and an interjamb disposed opposite the strap, the second connector including a second guide on a side of the second connector connected to the strap and a blank to receive the interjamb disposed opposite the strap;

inserting the interjamb into the blank, joining the first and second connectors to form an interface connector having the first guide on a first side of the interface connector and the second guide on the second side of the interface connector; and attaching the interface connector to an interface of a base unit, the interface of the base unit including first and second rails, the first and second guides configured to receive the first and second rails.

16. The method of claim 15, wherein the base unit further includes a locking mechanism including a locking pin exposed in the connector interface, the interface connector defining an opening to receive the locking pin, the method including locking the interface connector to the base unit.

17. The method of claim 15, the base unit further comprising a computational circuitry disposed in a housing, and wherein the strap includes a tamper circuitry in electrical communication with a first electrical contact on the first connector and a second electrical contact on the second connector, the interface of the base unit further including a contact pads, the base unit further comprising a detection circuitry in communication with the computational circuitry and the contact pads, the method further including performing tamper detection using the computational circuitry and the tamper circuitry.

18. The method of claim 15, wherein the base unit further includes communication circuitry in communication with the computational circuitry, the communication circuitry including a cellular data network circuitry, the method including communicating a tamper status through the cellular data network circuitry.

19. The method of claim 18, wherein the communication circuitry further includes wi-fi circuitry, the method including communicating the tamper status through the wi-fi circuitry.

20. The method of claim 18, wherein the base unit further comprising a location circuitry in communication with computational circuitry, the location circuitry including global positioning system (GPS) circuitry and one or more accelerometers, the method further including communicating a location using the communication circuitry.

* * * * *